(12) United States Patent
Sailer et al.

(10) Patent No.: US 11,891,021 B2
(45) Date of Patent: Feb. 6, 2024

(54) LOAD CARRIER

(71) Applicant: Jopindo GmbH, Bad Homburg v.d.H (DE)

(72) Inventors: Wolfgang Sailer, Mayrhofen (AT); Christoph Kainzner, Ramsau (AT); Christoph Hofer-Haas, Kaltenbach (AT); Hansjörg Geisler, Mayrhofen (AT)

(73) Assignee: JOPINDO GMBH, Bad Homburg V.D.H (DE)

( * ) Notice: Subject to any disclaimer, the term of this patent is extended or adjusted under 35 U.S.C. 154(b) by 93 days.

(21) Appl. No.: 17/603,752

(22) PCT Filed: Mar. 2, 2020

(86) PCT No.: PCT/EP2020/055436
§ 371 (c)(1),
(2) Date: Oct. 14, 2021

(87) PCT Pub. No.: WO2020/212005
PCT Pub. Date: Oct. 22, 2020

(65) Prior Publication Data
US 2022/0176886 A1 Jun. 9, 2022

(30) Foreign Application Priority Data

Apr. 15, 2019 (DE) ............ 20 2019 102 152.7
Jul. 17, 2019 (DE) ............ 20 2019 103 944.2

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................................. B60R 9/06; B60R 9/10
See application file for complete search history.

(56) References Cited

U.S. PATENT DOCUMENTS

| | | | | |
|---|---|---|---|---|
| 3,207,396 A | * | 9/1965 | Mundell | B60R 9/06 224/500 |
| 3,794,227 A | * | 2/1974 | Stearns | B60R 9/10 224/532 |
| 6,547,115 B1 | | 4/2003 | Kato et al. | |
| 7,703,834 B1 | * | 4/2010 | Hardy | B60R 19/023 296/144 |

(Continued)

FOREIGN PATENT DOCUMENTS

| | | |
|---|---|---|
| CN | 1939771 A | 4/2007 |
| DE | 10338723 A1 | 3/2005 |

(Continued)

*Primary Examiner* — Brian D Nash
(74) *Attorney, Agent, or Firm* — McGlew and Tuttle, P.C.

(57) ABSTRACT

A load carrier (1) for a vehicle (25) has a plurality of movable, laterally spaced support arms (12, 13), which are configured to be releasably fastened to a carrier part (3, 3', 3"). The load carrier (1) has a base part (2) to be permanently arranged on the vehicle (25), on which base part the plurality of support arms (12, 13) are jointly arranged. The plurality of support arms (12, 13) are jointly vertically displaceable, on the base part (10) with each being mounted to pivot about its own vertical axis (15).

18 Claims, 34 Drawing Sheets

(56) References Cited

U.S. PATENT DOCUMENTS

| | | | |
|---|---|---|---|
| 2003/0132259 A1* | 7/2003 | McLemore | B60R 9/10 224/924 |
| 2008/0067209 A1* | 3/2008 | Gunn | B60R 9/06 224/504 |
| 2012/0000952 A1* | 1/2012 | Dreger | B60R 9/10 224/533 |
| 2013/0182454 A1* | 7/2013 | Hofmann | B60R 9/10 362/549 |
| 2018/0001830 A1* | 1/2018 | Olaison | B60R 9/10 |
| 2022/0176886 A1* | 6/2022 | Sailer | B60R 9/06 |

FOREIGN PATENT DOCUMENTS

| | | |
|---|---|---|
| DE | 102005040182 A1 | 3/2007 |
| DE | 102007043126 A1 | 5/2008 |
| DE | 102007014442 A1 | 9/2008 |
| DE | 102012218817 A1 | 4/2013 |
| DE | 102012008124 A1 | 10/2013 |
| DE | 202011110640 U1 | 5/2015 |
| DE | 102014016195 A1 | 5/2016 |
| DE | 102015014269 B3 | 1/2017 |
| EP | 1160105 A2 | 12/2001 |
| EP | 1972501 A2 | 9/2008 |
| EP | 2033845 A1 | 3/2009 |
| EP | 2657051 A1 | 10/2013 |
| KR | 100940797 B1 | 2/2010 |
| WO | 03039913 A1 | 5/2003 |

\* cited by examiner

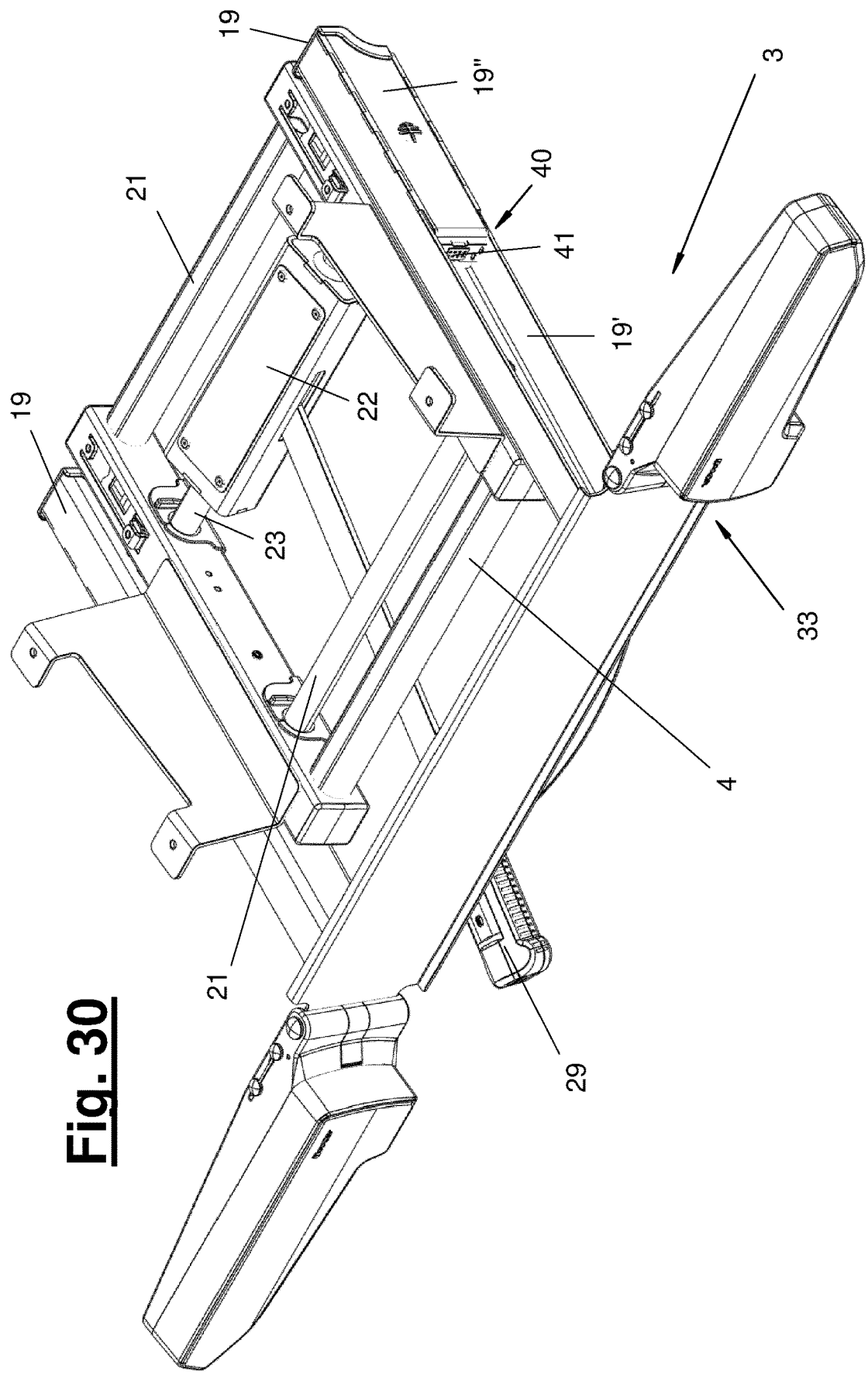

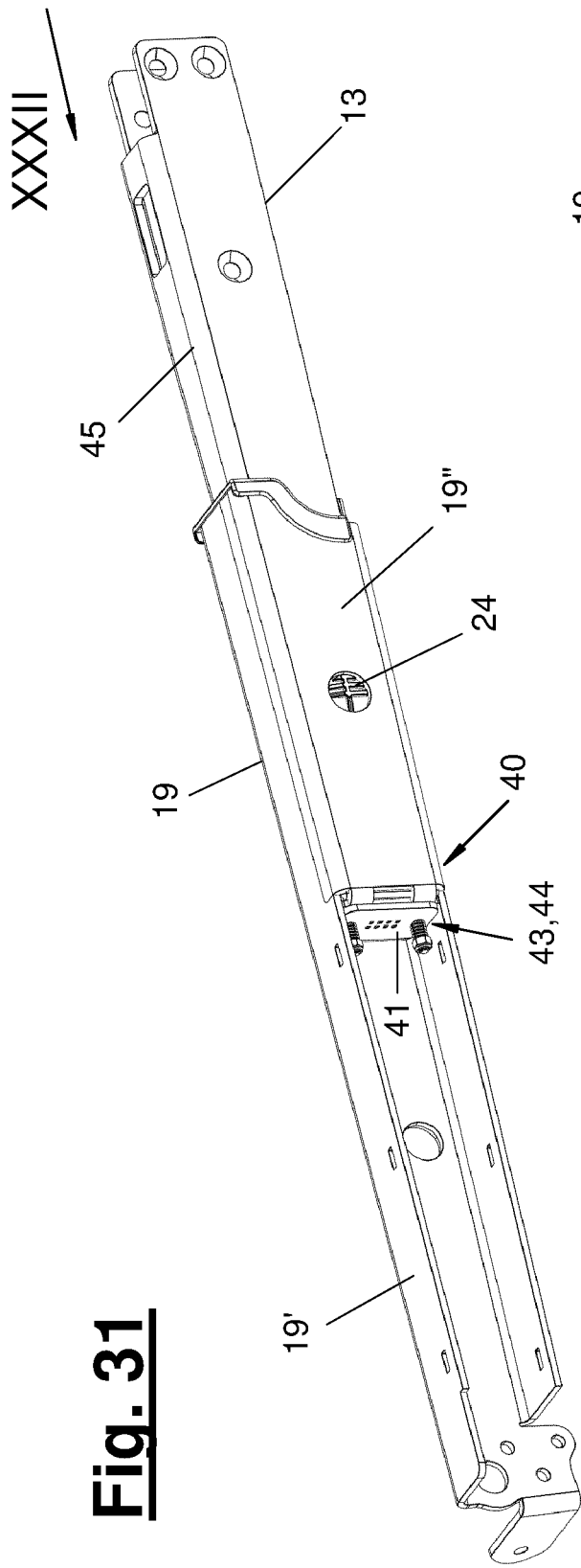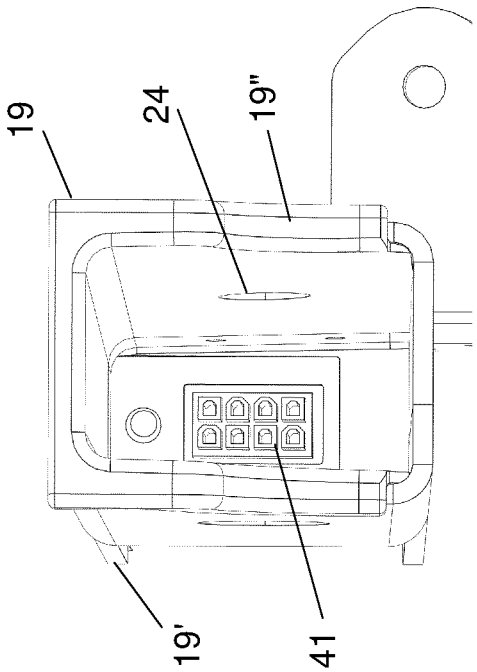

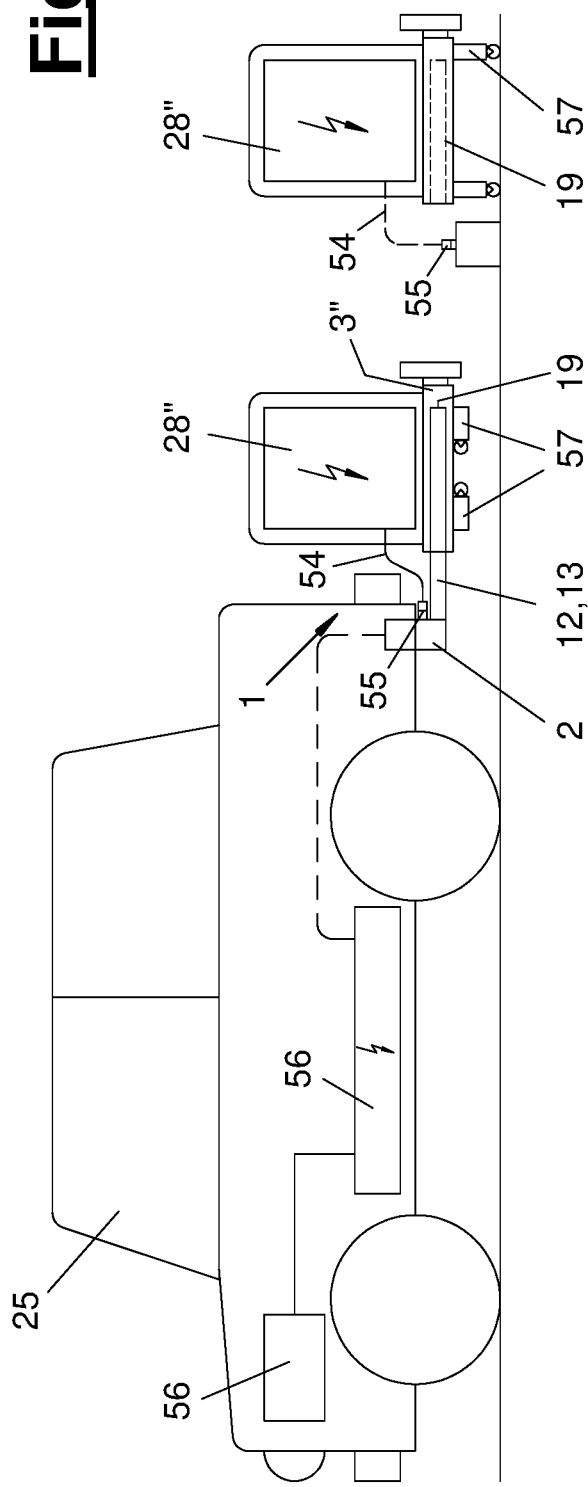
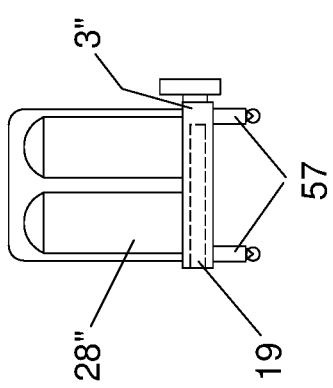

LOAD CARRIER

CROSS REFERENCE TO RELATED APPLICATIONS

This application is a United States National Phase Application of International Application PCT/EP2020/055436, filed Mar. 2, 2020, and claims the benefit of priority under 35 U.S.C. § 119 of German Applications 20 2019 102 152.7, filed Apr. 15, 2019 and 20 2019 103 944.2, filed Jul. 17, 2019, the entire contents of which are incorporated herein by reference.

TECHNICAL FIELD

The present invention pertains to a load carrier for a vehicle, especially a motor vehicle, wherein the load carrier has a plurality of movable and laterally spaced support arms, which are configured for the detachable fastening of a carrier part.

TECHNICAL BACKGROUND

A load carrier, which comprises two support arms arranged movably at the vehicle as a basic element for receiving a bicycle rack, is known from DE 10 2014 016 195 A1. The support arms are mounted on a crossbeam displaceably and rotatably in the direction of travel by means of swivel brackets and four-bar linkages. One of the support arms is additionally adjustable vertically by a turning and sliding joint or by another four-bar linkage. The crossbeam is arranged open with the support arms behind a bumper and is mounted vertically adjustably at the vehicle at a vertical sliding block guide bent at the lower end. The crossbeam and the support arms perform as a result a curved travel motion between the stowed position and a tilted use position.

EP 2 033 845 B1 shows another load carrier. It has a frame-like carrier structure, which can be pivotably adjusted vertically about a horizontal axis by means of a spindle nut, wherein the carrying device is mounted longitudinally displaceably at the spindle nut in the axial direction of the vehicle and can be pulled out thereby for assuming the operating position under the floor of the vehicle. The carrying structure has at its free end two support arms, which are pivotable about a horizontal axis and into which holding pins of a bicycle rack can each be inserted on the front side.

WO 03/039913 A1 shows another load carrier with support arms which can be pivoted out without vertical adjustment.

SUMMARY

An object of the present invention is to provide an improved load carrier.

A configuration of the load carrier with a common base part and with the vertically adjustable and pivotable mount of the support arms, which mount is located there, has various advantages.

The support arms can assume a lifted position in the pivoted-in out-of-use position. They can be arranged now concealed at the vehicle. In particular, they may be located, in particular, above an adjacent edge of the vehicle, e.g., the lower edge of the rear of the vehicle. The support arms can be lowered and then pivoted out for assuming the used position. During the lowering motion, the support arms can be lowered into a position below said edge of the vehicle and then pivoted out under the edge of the vehicle. The support arms project beyond said edge of the vehicle in the pivoted-out use position and make possible the attachment and the detachable fastening of a carrier part.

The load carrier being claimed makes possible a heavy load, and it is possible to accommodate, e.g., a plurality of heavier E-bikes, range extender batteries, gas cylinders or other heavy loads. Further advantages pertain to a favorable position of the center of gravity, improved ground clearance, more comfort as well as ergonomics and a better and more secure fastening of the load. The design effort and the effort needed for control are reduced. The kinematics is improved, and the motions and the axes of motion of the support arms are defined in a favorable manner and can be controlled accurately. The support arms can be moved better to and fro between the concealed out-of-use position at the vehicle and the pivoted-out use position.

A straight shape of the support arms is especially advantageous for this. In addition, a possible oblique position of the base part is favorable. The support arms may extend obliquely upwards in the extended use position and support the weight of a load taken up on the load carrier. The oblique position also has a favorable effect for the ergonomics and for the ground clearance, especially in case of recreational vehicles or the like with a greater rear overhang. As an alternative, a normal orientation of the base part with horizontally directed support arms is possible. Horizontal support arms make possible a special docking procedure.

The two or more support arms are arranged together at the base part, which is arranged secured to the vehicle. The plurality of support arms are mounted together at the base part vertically adjustably, especially vertically displaceably. The support arms are mounted pivotably each about its own vertical pivot axis. The support arms may be arranged at mutually spaced locations, i.e., at right angles to the longitudinal direction of the vehicle. They may be located, in particular, at the lateral edges or corner areas of the base part.

An installation location of the base part at a short distance in front of the rear wall or of the rear bumper of the vehicle is especially favorable. The support arm or the support arms can be moved as a result into the use position unhindered at and especially under the rear of the vehicle. While preserving a high level of stability, they can project far enough to the rear beyond the rear of the vehicle.

The preferably displaceable, especially linear vertical adjustment of the support arms may take place together via the base part. The support arms may be arranged correspondingly at the base part. The pivoting motion is carried out by the support arms preferably individually. A sequence of motions and pivoting motions may also be predefined in this case. The support arms may have each a pivot bearing of their own and a pivot drive of their own.

The support arms may be pivoted each about a vertical axis and adjusted in their vertical positions along the same axis or along a parallel axis in relation to the ground. The vertical axes are preferably straight. They may have an inclination directed away from the adjacent edge of the vehicle in the installed position. The support arms can assume hereby in the use position the aforementioned oblique position, which is favorable for support. The vertical axes may be oriented vertically as an alternative.

The joint vertical adjustment at the base part may take place, e.g., via a lifting bridge, which is located there. The lifting bridge can be moved up and down, preferably linearly, with a drive of its own, especially with a lifting drive. Thanks to the straight shape of the support arms, only a slight vertical path or lifting path is necessary. The support arms can be pivoted out into the use position in the lower lifting position without an interfering contour under the edge of the vehicle or under the floor of the vehicle.

The support arms may always be arranged at the base part at the same level in the vertical direction. They may be at the same level in the axial direction of the vehicle one behind another and possibly next to one another in the pivoted-in out-of-use position and they may also be at the same level in the pivoted-out use position. This may be achieved in different ways. The vertical pivot axes may have an offset, for example, in the axial direction of the vehicle. On the other hand, the support arms may have a conical shape tapered towards the free end of the arm in the top view, in which case they sweep over different pivot angles about their respective vertical pivot axes.

The configuration of the base part with a housing and with a lifting and pivoting device arranged therein has essential advantages concerning the compact and space-saving mode of construction, in terms of the lower design effort and control effort as well as in terms of possibility of an encapsulated mounting of the support arms in the out-of-use position within the housing. The support arms may be supported at the housing in the pivoted-out use position.

Contrary to the state of the art, the support arms of the load carrier being claimed can be reliably protected in the out-of-use position from unfavorable environmental effects, especially splash water, snow, falling rocks, and the like. The design effort as well as the space requirement and the motion kinematics are especially favorable in case of straight support arms. The vertical pivot axis for the support arms as well as the shape of the support arm oriented at right angles to this pivot axis also have a space-saving effect. The preferably linear lifting motion and the pivoting motion of the support arms may take place along and about said axis.

The load carrier may have a base part, which may be mounted secured to a vehicle by means of an attachment fitting. The base part, which is secured to the vehicle, is arranged in a secured position on the vehicle. A trailer hitch may also be mounted at the base part and/or at the attachment fitting. This may be carried out by means of a crossbeam to be attached to the vehicle. The base part may also be mounted to this crossbeam.

The load carrier may also have, in addition to the base part, a carrier part, at which a load can be taken up. The load carrier may also be sold with the base part without a carrier part. The carrier part itself is an independent product. It may be mounted at an existing base part and also be replaced. Further, a desirable number of different carrier parts, which can be detachably connected to the base part, may be present.

The loose carrier part may be detachably attached, especially plugged onto or plugged into, the support arm or support arms. The carrier part connects and stabilizes the support arms in the use position thereof.

The carrier part may have a preferably bridge-like carrying part, especially a so-called carrying bridge, which can be connected to the pivoted-out support arms, and a load support device. The carrying part may have, as an alternative, a different configuration. It will hereinafter be called a carrying bridge, and the configuration features may be extrapolated to other forms of carrying part as well.

An auxiliary carrier for an additional load support device may be mounted at the carrying bridge. The carrying bridge and possibly the auxiliary carrier may be permanently or detachably connected to the load support device. A load support device makes possible the particular exact positioning and fixation of the load support device at the carrying bridge or at the auxiliary carrier.

The connection between the pivoted-out support arms and the carrying bridge may be established in any desired manner. It may be a plug-type connection, a simple support or another connection. The carrying bridge may be attached to the base part in any desired and suitable manner.

In an advantageous embodiment of the connection, the carrying bridge may be placed on or plugged onto the support arms loosely from the top and/or from the front with an e.g., cuff-like support part and attached to the middle area of the support arms. This may be brought about by means of a locking. This will ensure a secure fixation and coupling connection between the carrier bridge and the support arms of the base part. The locking may act in three or more space axes.

The loose carrier part may be configured for heavy loads of, e.g., 150 kg and more and can carry these due to the high stability of the base part and of the support arms. These one or more loads that can be taken up or are taken up at the carrier part may have different shapes, e.g., they may be bicycle racks, containers or the like. Especially heavy loads may be formed by a range extender battery for an electric vehicle, by gas cylinders, e.g., for a recreational vehicle, or by a fuel tank. Such loads may also be formed by other objects or even bulk materials, fluids or the like.

The range extender battery, gas cylinders, fuel tank or the like may be a mobile media storage device, especially an energy storage device, whose medium may be used to supply a consumer in the vehicle, especially motor vehicle or also a trailer. A suitable and preferably detachable media connection may be present for this purpose. This may be coupled detachably at the base part or at another location, e.g., directly at the vehicle, e.g., at an adapted media port. A medium, e.g., electrical energy, gas, liquid fuel or the like, may be transferred via the media connection to said consumer in the vehicle. The consumer may be, e.g., an energy storage device of the vehicle, e.g., a battery or rechargeable battery, fuel tank or the like, or a drive, especially a motor, or a heater, a cooler or the like. On the other hand, the media connection may be used to resupply the mobile media storage device, e.g., to recharge the range extender battery at a stationary charging station.

The loose carrier part with the media storage device, especially storage device, makes possible a rapid and uncomplicated resupply of the vehicle by replacing the media storage device at a supply station. A plurality of media storage devices, especially energy storage devices, may be stocked at the supply station. They may be recharged or refilled here. The supply station may be set up at the home of the vehicle operator, at a gas station, in an automobile dealership or the like.

The loose carrier part may especially be adapted to heavy loads. The carrying part may have an attached or attachable carrying device for support in the detached state, in which it is removed from the base part and from the support arms. The carrying device may be adjustable. It can be put out of operation for the vehicle operation. The carrying device may be formed, e.g., from carrying feet, which van be swung out and/or optionally vertically adjusted. They may be movable, e.g., by means of rollers or in another manner on the ground. The vertical adjustment may be configured and carried out in different ways, e.g., manually or by a motor drive or by a fluid drive. The vertical adjustment of the carrying device makes possible an adaptation to different and vehicle-specific support arm levels.

The base part with swung-out and horizontally oriented support arms makes possible an easy docking and undocking of the carrier part, e.g., by a horizontal travel motion or pushing motion. This is especially advantageous for said heavy loads. In addition, a vertically adjustable carrying device, which can hold the carrier part at the suitable docking level in relation to the swung-out support arms and can optionally also lower them for placement on the support arms, is favorable. The undocking is also facilitated hereby. The support arms and the support parts can be meshed (engaged) and unmeshed (disengaged) with the carrier part during docking and undocking.

The load carrier being claimed with the base part and with the support arms, which can be lifted and lowered, as well as with the detachable carrier part is especially suitable for said loads, especially for a media storage device, preferably for a range extender battery.

In an independent aspect of the present invention, the load carrier may comprise for such heavy loads a base part with pivotable support arms without vertical adjustment of said support arms, and a carrier part in said configuration. A loose carrier part in the configuration mentioned with a media storage device, especially with a range extender battery, with a gas tank or with gas cylinders, with a fuel tank, likewise represents an independent invention.

The load carrier may have an energy supply unit and a plug-type connection for transmitting energy and/or signals between the support arm and the carrier part. The plug-type connection may be present as a single connection and be associated with only one individual support arm. As an alternative, a plurality of plug-type connections are possible, which may also be arranged at a plurality of support arms. The plug-type connection may be located in the area of the mechanical connection or attachment point between the support arm in question and the carrier part.

Energy and preferably also signals can be transmitted with the plug-type connection to one or more consumers at the carrier part. These may be, e.g., electrical energy and turn signals or brake signals or other signals. The transmission may be to rear lights at the carrier part, e.g., tail lights, brake lights, turn signals, reverse lights or the like. Other consumers, e.g., locks, which can be operated electrically or with another form of energy, additional lights or the like may also be supplied at the carrier part.

The plug-type connection has independent inventive significance. It may also be used in other load carriers for a vehicle, especially a motor vehicle. Such a load carrier may have a movable, especially pivotable support arm that can be arranged or is arranged at the vehicle, and a carrier part, which can be attached or is attached detachably to the support arm, wherein the load carrier has an energy supply unit and a preferably individual plug-type connection for transmitting energy and/or signals between the support arm and the carrier part.

Said transmission of energy and/or signals between a movable support arm and the carrier part has advantages for the safety and the accessibility of the plug-type connection. In addition, the ease of use when attaching and separating the carrier part to and from the one or more pivot arms can be improved. Special advantages arise in case of one or more support arms which are movable, preferably pivotable between a preferably concealed out-of-use position at the vehicle and an extended use position. The connection, especially transverse connection, of the support arms by the carrier part is preferably carried out in the area of the free ends of the support arms.

The plug-type connection may be arranged in the use position outside, especially behind the outer contour of the vehicle. It may be spaced from the motor vehicle on the rear side and be brought closer to the operator. As a result, it is accessible better and in a simpler manner and is more visible than in case of a plug-type connection arranged stationarily at the rear of the vehicle. The mechanical connection and attachment point between the support arm in question and the carrier part is likewise more accessible and visible.

In the extended, especially pivoted-out use position, the support arm may project beyond the adjacent edge of the vehicle, especially the rear of the vehicle. This has advantages for the easy and visible attachment of the load carrier at the support arm or support arms and also for the closing of the plug-type connection. To remove the carrier part, the plug-type connection may also be detached again in a simple and readily accessible manner.

The carrier part may have a support part for a detachable attachment to the support arm. In case of a plurality of support arms, a plurality of support parts may be present. Especially favorable is a configuration of the support parts that allows a positive-locking, preferably pluggable fastening to the support arm. The support part may have, e.g., an oblong arm mount for this. The oblong arm mount may have a sleeve-like or pin-like configuration, the associated support arm having a corresponding pin-like or sleeve-like counter-contour.

The plug-type connection is preferably used to transmit electrical energy and electrical signals. However, it may also be used for other energy and/or signal transmission, e.g., inductively, optically, etc. The plug-type connection has two or more plug-in parts that can be connected detachably to one another, one plug-in part being arranged at the support arm and one plug-in part at the carrier part, especially at the associated support part.

There are various possibilities for arranging the plug-in parts and for the connection kinematics. In one variant, the plug-in parts may be arranged at the support arm and at the support part, always on the front side. In addition, they may be oriented in the plug-in direction. This is especially favorable for a support part with an oblong arm mount. In another embodiment, the plug-in parts may be arranged each laterally at the support arm and at the carrier part, especially at the associated support part. They may also have a front-side distance from the respective front end of the support arm and the carrier part or support part.

The plug-type connection may generally be configured advantageously to be closed by a relative motion between the carrier part, especially the support part, and the support arm when the carrier part is fastened to the support arm. This may be a guided relative motion, which facilitates and ensures the meeting of the plug-in parts during the closing of the plug-type connection. The relative motion may be a translatory and/or rotatory motion. A translatory, especially linear plug-in motion is especially favorable in the case of the base part with straight support arms that can be swung out. A front-side arrangement of the plug-in parts is also advantageous for this.

The plug-type connection can be closed at the same time in case of fastening of the loose carrier parts at the one or more support arms. This simplifies and facilitates the mounting and removal of a carrier part and also simplifies the operation. The closing/opening of the plug-type connection at the time of the attachment-separation of the carrier part can take place automatically. The operator cannot as a result forget to close the plug-type connection for transmitting energy and/or signals.

The plug-in parts of the plug-type connection may be configured and arranged such that they are connected to one another by a said relative motion between the carrier part, especially the support part, and the support arm during the attachment or fastening of the carrier part to/at the support arm, and are caused to mutually mesh with one another. The mutual meshing may be a positive-locking meshing. One plug-in part may be configured, e.g., as a plug with pins and the other plug-in part as a socket with hollow receptacles for the pins. The plug-in parts preferably have a multipolar configuration.

A plug-in part may be arranged at a mount with a spring such that it is capable of yielding elastically. Such an arrangement may be provided for one of the preferably two plug-in parts of the plug-type connection or for a plurality of, especially both plug-in parts. The possibility of performing an elastic yielding motion has advantages for securing the plug-type connection and for the energy and signal transmission during travel and for compensation due to motions of the carrier part. The plug-type connection is relieved by the possibility of elastic yielding and can follow, e.g., vibrating motions.

The load carrier may have a motion-tolerant, especially pivoting-tolerant line, which is led along the support arm, and which is connected to the energy supply unit as well as to a plug-in part of the plug-type connection. This line can be carried along during the motion, especially during the pivoting motion of the support arm in question. The line may be led along the support arm at a closely spaced location. This secures and protects the line. In addition, excessive line slack and the risk of getting caught at obstacles during the travel are prevented. The line can be concealed together with the support arm in question and received at the base part in the out-of-use position. A line may likewise be installed at the carrier part from the plug-in part located there to the one or more consumers, especially to a light carrier. Narrow and secure line guides are possible at the support arm and at the carrier part due to the defined plug-type connection. The energy supply unit of the load carrier can be connected or is connected to an energy source and/or to a signal transducer. The load carrier may have, as an alternative or in addition, an energy source of its own, e.g., a rechargeable electric battery and a solar cell. The transmission of signals from the motor vehicle to the carrier part may be a wired or wireless connection, e.g., via radio, Bluetooth, infrared, etc. The transmission of energy and signals to the carrier part may take place together via the energy supply unit and said lines or separately and over different paths.

The energy supply unit of the load carrier may have one or more feed lines to one or more additional consumers. This may be, e.g., a socket holder or a socket of an additional trailer coupling, which is arranged at the load carrier additionally and centrally, e.g., at the crossbeam or at the base part.

To transmit preferably electrical energy and/or preferably electrical signals, the support arm provided with a plug-in part may be adapted in an interference-free manner. It support arm may have an arm housing and an electrically insulated insert arranged therein with a plug-in part mounted on the front side. The plug-in part is preferably configured as a socket, which is advantageous for the protection against damage. The arm housing may consist of a mechanically stressable and environmentally resistant material, e.g., metal. The support arm is preferably pin-shaped.

The support part may have an oblong and sleeve-like arm mount, in which a plug-in part is arranged at the rearward end in a set-back position. It is located protected and concealed in the inner cavity of the arm mount. It may be configured as a plug. The arm mount encloses and guides the pin-like support arm during plugging in. It also facilitates and secures in the process the meshing of the plug-in parts and the closing of the plug-type connection. The arm mount may also be made of an electrically insulating material.

The present invention is shown schematically as an example in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 9 is a perspective view of the base part with support arms pivoted in;

FIG. 30 is a perspective view of the carrier part with a plug-type connection;

FIG. 31 is a support arm and a support part at the carrier part from FIG. 30 with an electrical plug-type connection in a perspective view;

FIG. 32 is a rear view of the support part according to arrow XXXII in FIG. 31;

FIG. 39 is a schematic side view of another variant of the load carrier with a carrier part and with a media storage device; and FIG. 40 is a schematic view of the variant of FIG. 39.

DESCRIPTION OF PREFERRED EMBODIMENTS

Figure 1:
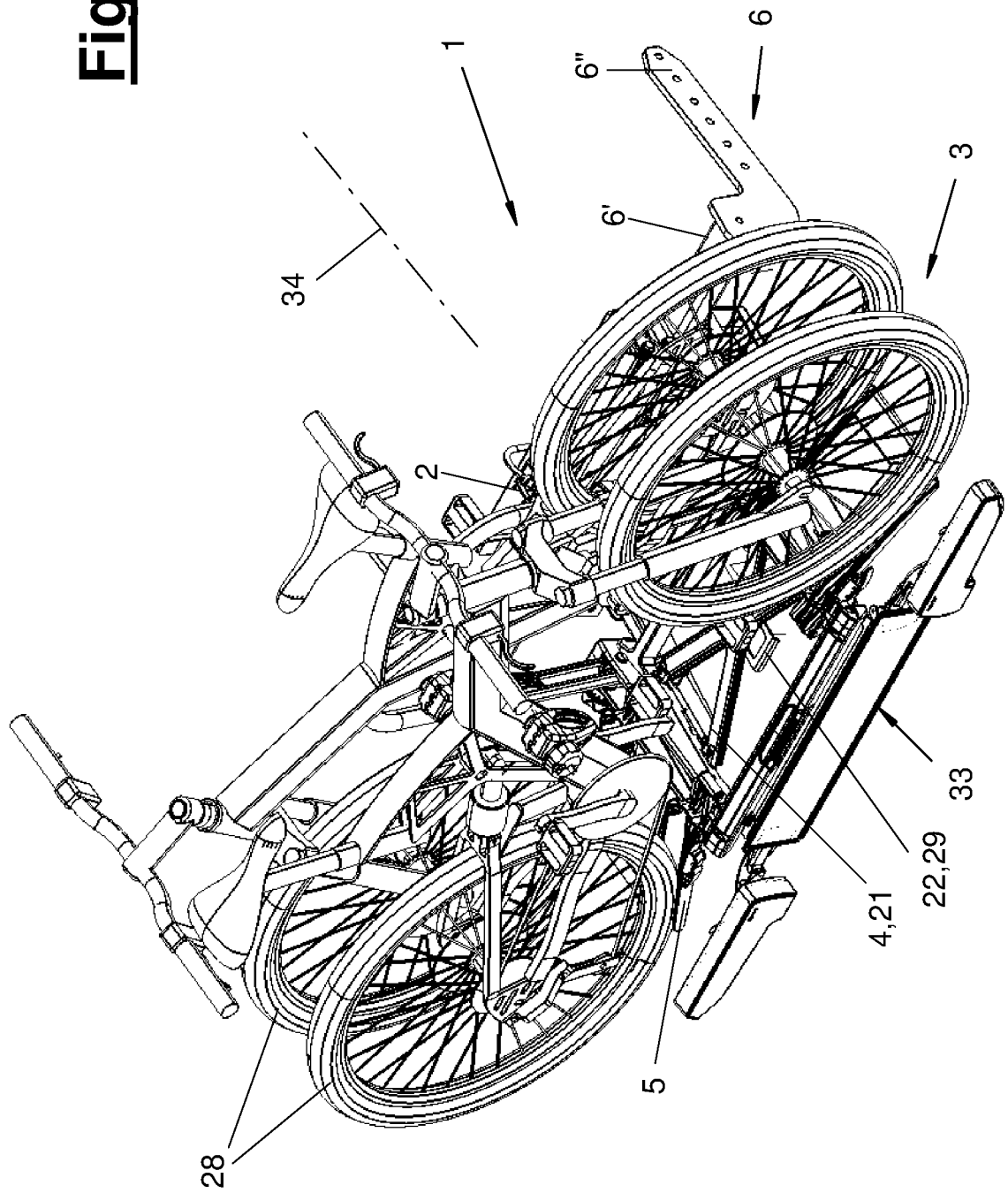
FIG. 1 is a perspective view of a load carrier with a load.
Figure 2:
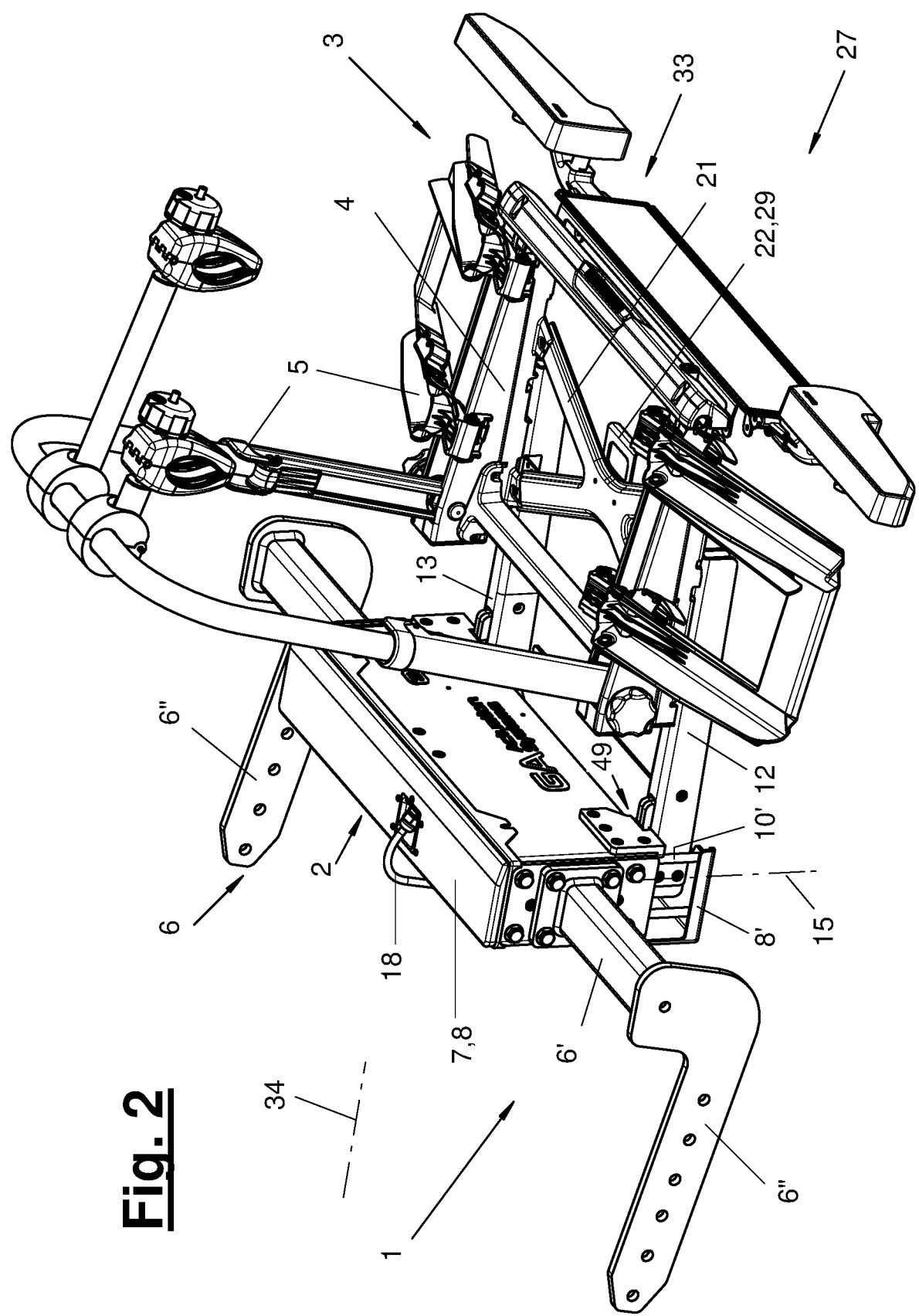
FIG. 2 is a perspective view of the load carrier from FIG. 1 without load.

Referring to the drawings, the present invention pertains to a load carrier (1). It is used to receive a load or charge (28, 28'). The load carrier (1) is intended for a vehicle (25), especially a road vehicle, and can be attached here. The vehicle (25) may be configured, e.g., as a motor vehicle, especially passenger car, box-type delivery van or recreational vehicle. The vehicle (25) has a longitudinal axis or travel direction (34).

The load carrier (1) may be especially a rear carrier. The attachment situation at the rear of a vehicle (25) is suggested by broken lines in FIGS. 3 and 20.

The load carrier (1) has at least one base part (2), which can be arranged and attached to the vehicle (25). The base part (2) is directed in the installed position at right angles to the longitudinal axis (34) and is located at the rear area of the vehicle (25). It is arranged, e.g., at or in front of the rear wall and preferably largely concealed. The load carrier (1) may have an attachment fitting (6) for a preferably stationary mounting of the base part (2) on the vehicle (25).

The attachment fitting (6) may have stub-like carrying arms (6') directed at right angles to the vehicle longitudinal axis (34). These may be attached to the base part (2) on both sides. They may have each a respective attachment flange (6") or the like at the free ends for attachment to a chassis or to the body of the vehicle (25).

In the embodiments according to FIGS. 10 through 22, the attachment fitting (6) has a crossbeam (36), which passes through over the width of the vehicle and at which the base part (2) can be mounted in a suitable manner, e.g., suspended. Attachment flanges (6") or the like may be arranged at the ends of the crossbeam (36) for the vehicle-side attachment.

In addition, a trailer coupling (35) as well as a socket holder (35') or a socket may be mounted centrally at the crossbeam (36) as needed. The trailer coupling (35) may be configured as a removable or movable, especially pivotable part. The mounting part of a removable, especially plug-type trailer coupling (35) may be fastened at the crossbeam (36). The removable or movable trailer coupling (35) does not interfere with the handling and with the loading operation of the load carrier (1).

The attachment fitting (6), especially the crossbeam (36), may already be present, as an alternative, at the vehicle (25).

The load carrier (1) may have, in addition, a carrier part (3, 3'). This may be detachably connected to the base part (2). It can be removed and also replaced as needed. The carrier part (3, 3') may have different configurations. It is used to receive a load or charge (28, 28'). The carrier part (3, 3') has one or more load support devices (5, 5'). These may be adapted to a load or charge (28, 28').

The carrier part (3) shown in FIGS. 1 through 9 and 19 through 22 is configured for receiving an individual load (28), e.g., one or more bicycles. Another load (28') may be, e.g., an open or closed container or a box.

The carrier part (3') shown in FIGS. 10 through 18 can receive a plurality of, e.g., two identical or different loads (28, 28'). These may be, e.g., bicycles and an open or closed container or a box.

The loads (28, 28') may be arranged one behind another in the travel direction (34). Moreover, further configuration variants are possible.

The load carrier (1) may be configured as an assembly comprising a base part (2) and one or more identical or different carrier parts (3, 3'). The respective carrier part (3, 3') is adapted to the base part (2). The carrier part (3, 3') may be an independent product and an individual subject of the invention. It may be manufactured and sold separately from the base part (2).

The carrier part (3) may have, e.g., a bridge-like carrying part (4) and a load support device (5). The carrying part (4) will be described below as a carrying bridge. It may have, as an alternative, a different configuration.

The carrier part (3') for a plurality of loads (28, 28') may likewise have the carrying bridge (4) with the load support device (5) and, in addition, with a frame-like auxiliary carrier (37) with an additional load support device (5') for the additional load (28'). The auxiliary carrier (37) may be mounted permanently or detachably at the carrier part (3'), especially at the carrying bridge (4). The auxiliary carrier (37) and its load support device (5') increase the load capacity of the load carrier (1) and may be mounted or removed as needed.

Figure 19:
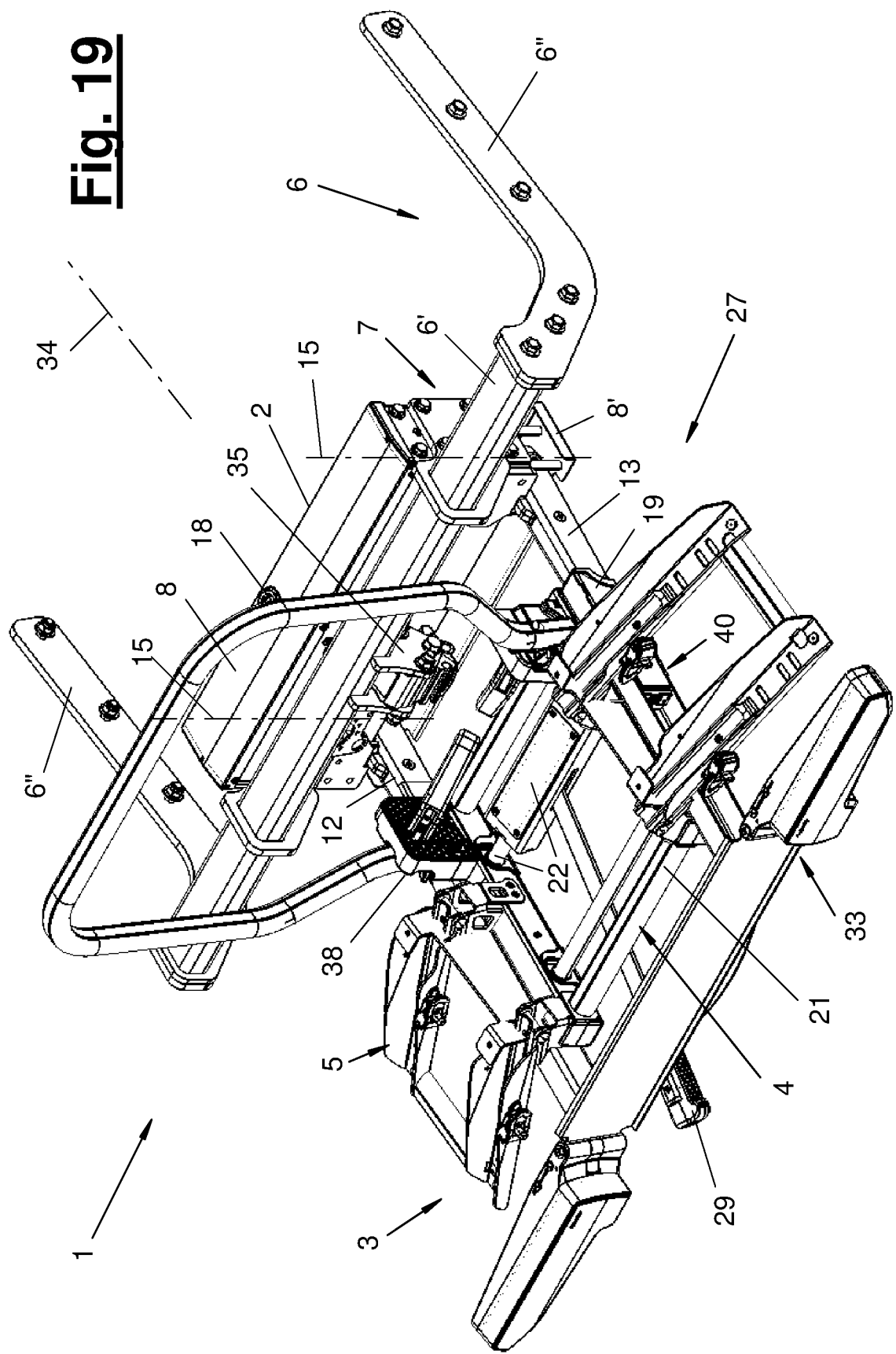
FIG. 19 is a perspective view showing a variant of the load carrier from FIG. 1 without a load.
Figure 20:
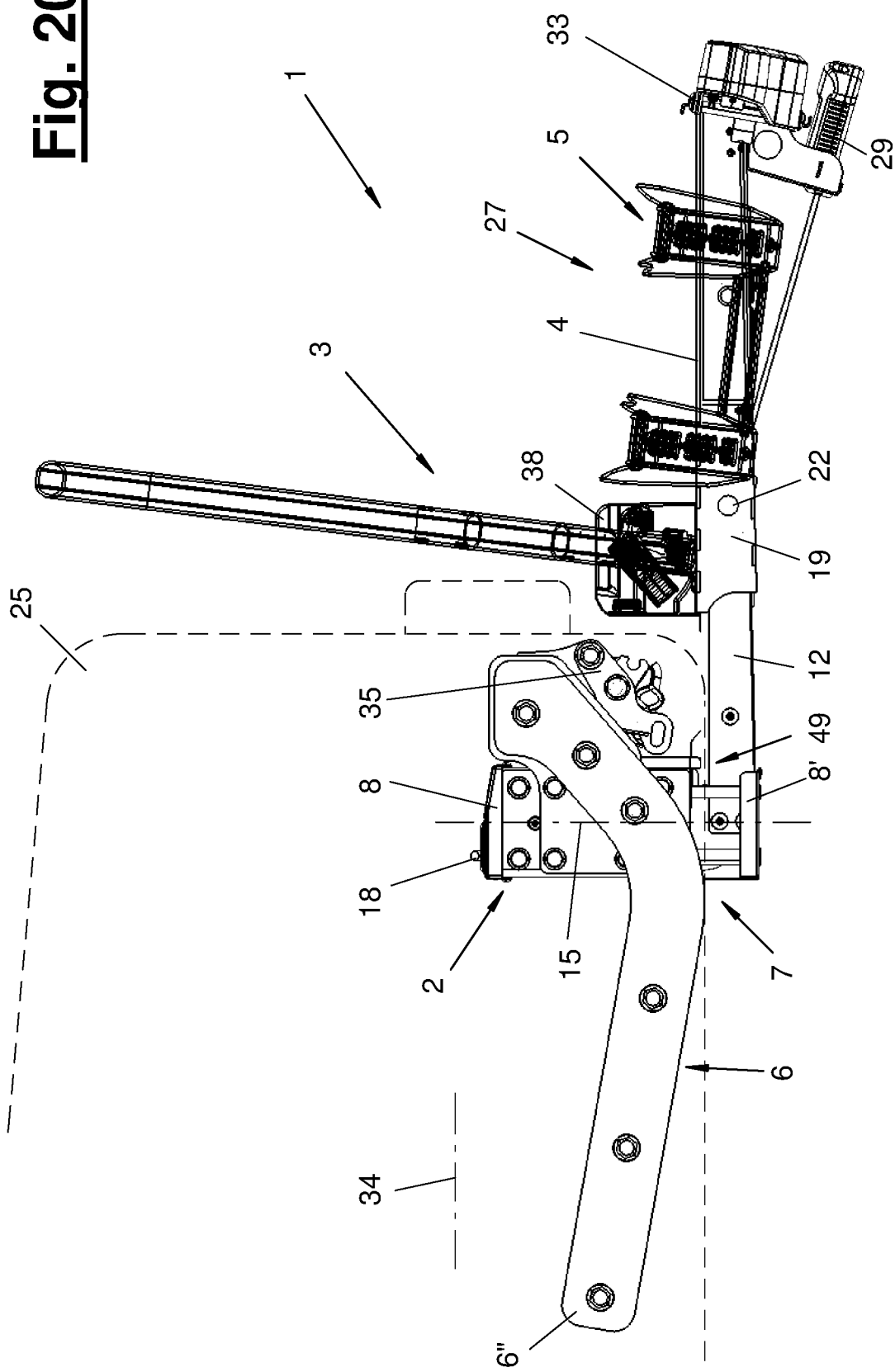
FIG. 20 is a side view showing the variant of the load carrier from FIG. 1 without a load.
Figure 21:
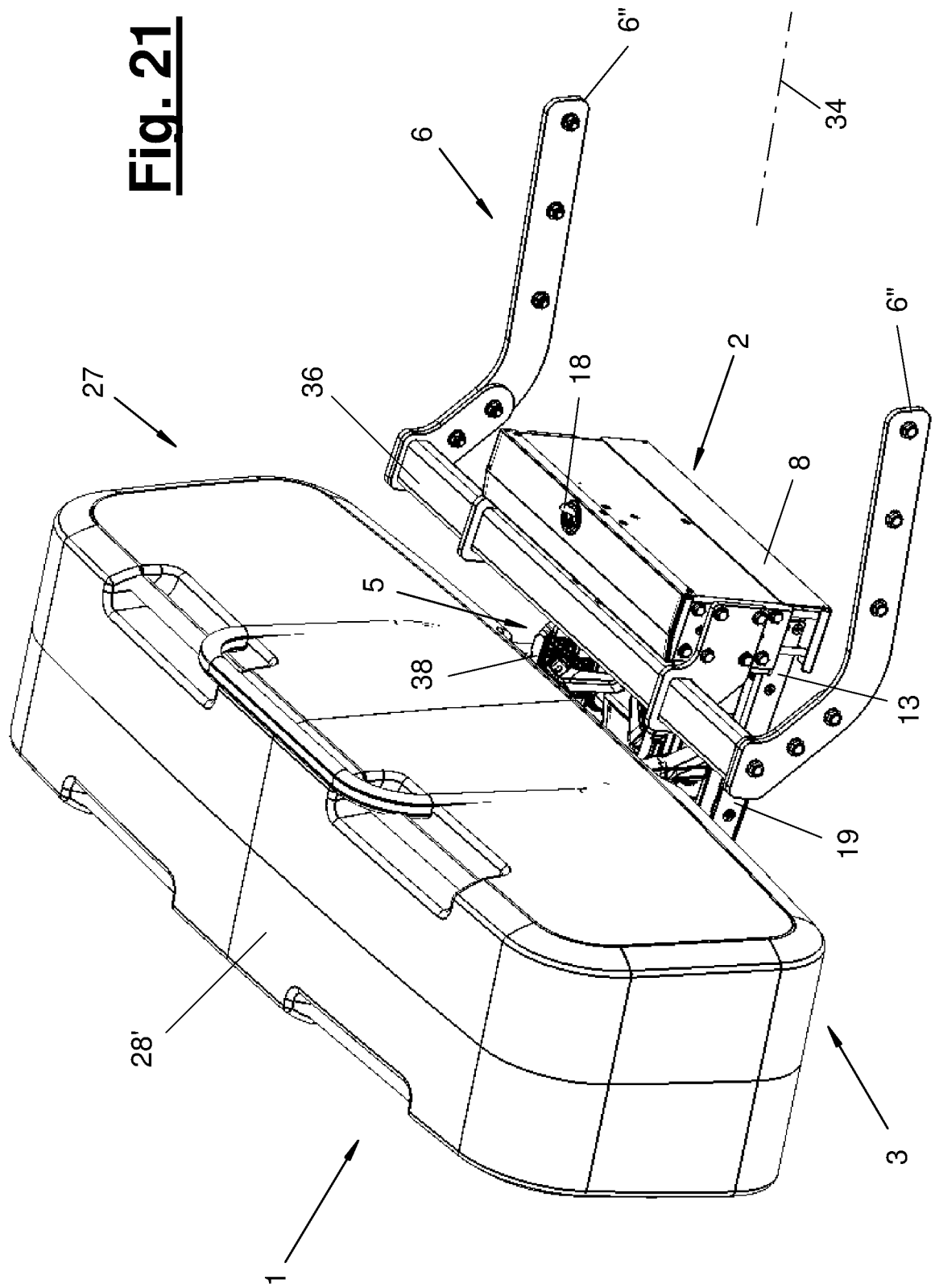
FIG. 21 is a perspective view showing the variant of the load carrier from FIG. 1 with a load.

A load support device (5) may be configured, e.g., as a single-bicycle rack or as a multi-bicycle rack. Another load support device (5) may be configured, e.g., as a container mount. The load support devices (5, 5') may have an upright strap, which may be used to fasten the load, e.g., for bicycle frames, and optionally as a grip to facilitate handling. This is also shown in FIGS. 19 through 21.

The carrying part, especially the carrying bridge (4), and the load support device (5) may have each a one-part or multipart configuration. The carrying bridge (4) and the load support device (5) may be configured as separate units and be connected to one another permanently or detachably. They may also be configured as an integral assembly unit. The auxiliary carrier (37) and its load support device (5") may have a corresponding configuration.

A detachable load support device (5, 5') may be positioned and preferably clamped in a positive-locking manner at the carrying bridge (4) or at the auxiliary carrier (37) with a respective fastening device (38). The fastening device (38), which can be operated manually, may interact with a pivotable strap or grip, which can be turned into a horizontal position from the vertical position shown. Tensioning claws or the like can be actuated by the rotation for fastening and detaching. The turned-down position makes possible, in addition, a space-saving stowage.

The load carrier (1) preferably has a plurality of, especially two movable support arms (12, 13), which are provided for receiving and detachably connecting, especially fastening, a carrier part (3, 3') at the base part (2). The carrier part (3, 3') is carried by the support arms (12, 13) in the attached position. It may lie now loosely or in a guided manner on the support arms (12, 13) and may be detachably fastened at the base part (2) in any desired and suitable manner. The carrier part (3, 3') may be detachably fastened at the support arms (12, 13) or at another location of the base part (2).

The support arms (12, 13) are arranged together at the base part (2). They may be a component of the base part (2). The support arms (12, 13) are mounted vertically adjustably at the base part (2) and are, in addition, mounted pivotably each about an own vertical axis (15). The vertically adjustable arrangement may be a vertically slidable arrangement. In particular, the support arms (12, 13) may be adjusted vertically together, especially displaced. They may be arranged correspondingly at the base part (2). In a preferred embodiment, the support arms (12, 13) are arranged vertically adjustably, preferably vertically linearly displaceably, along the straight vertical axis (15).

Figure 3:
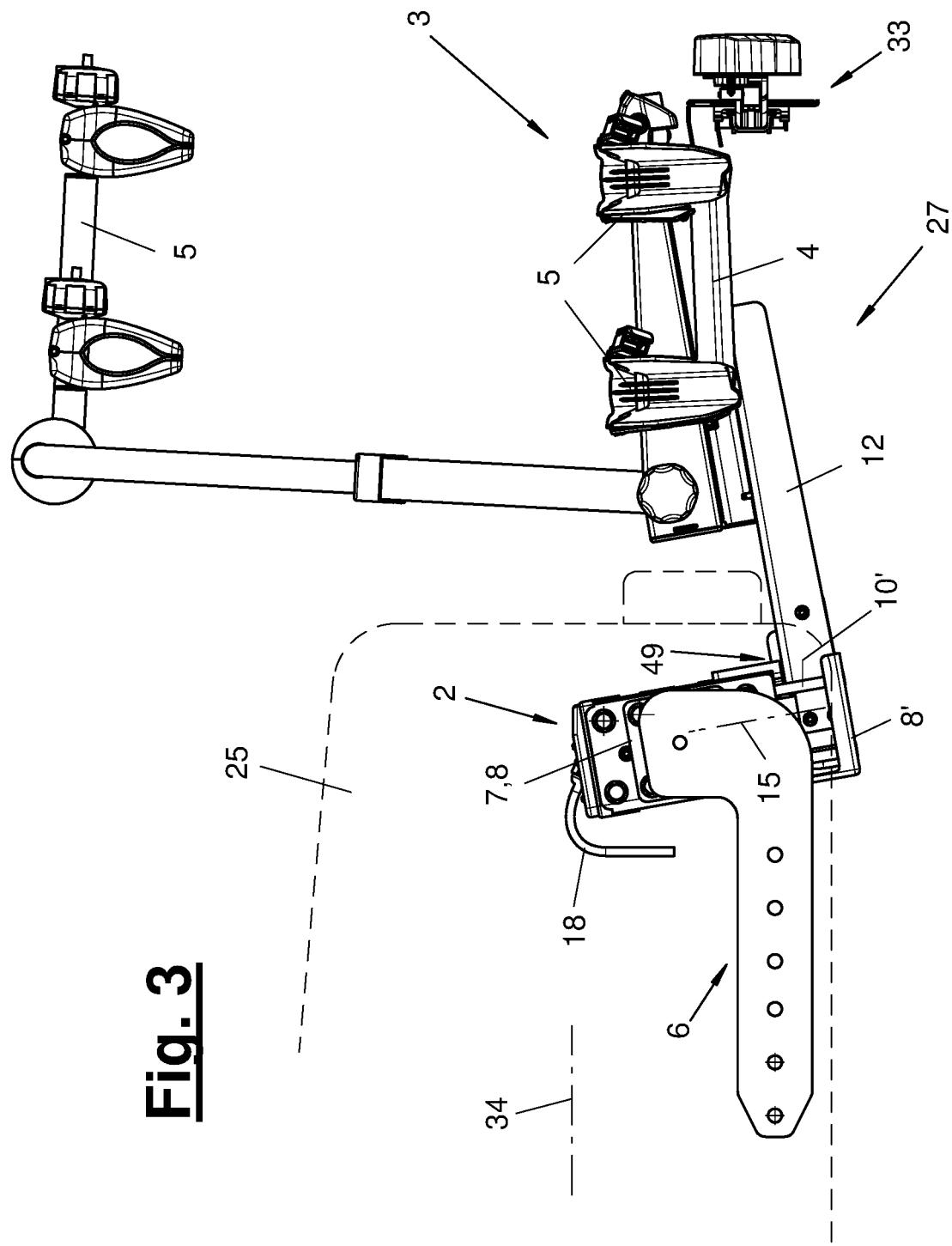
FIG. 3 is a side view of the load carrier from FIGS. 1 and 2.
Figure 4:
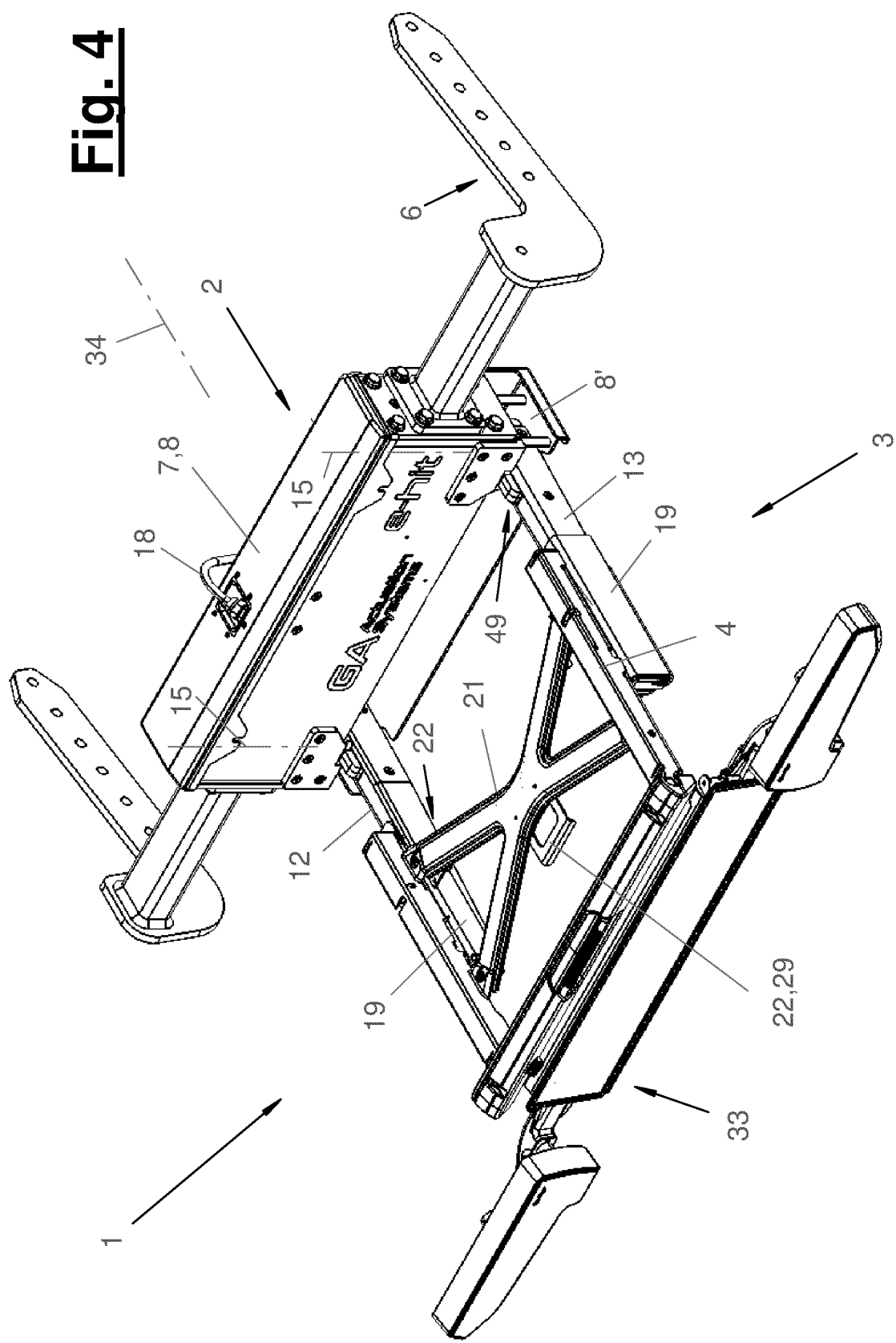
FIG. 4 is a perspective view of a base part and of individual components of a carrier part of the load carrier.
Figure 5:
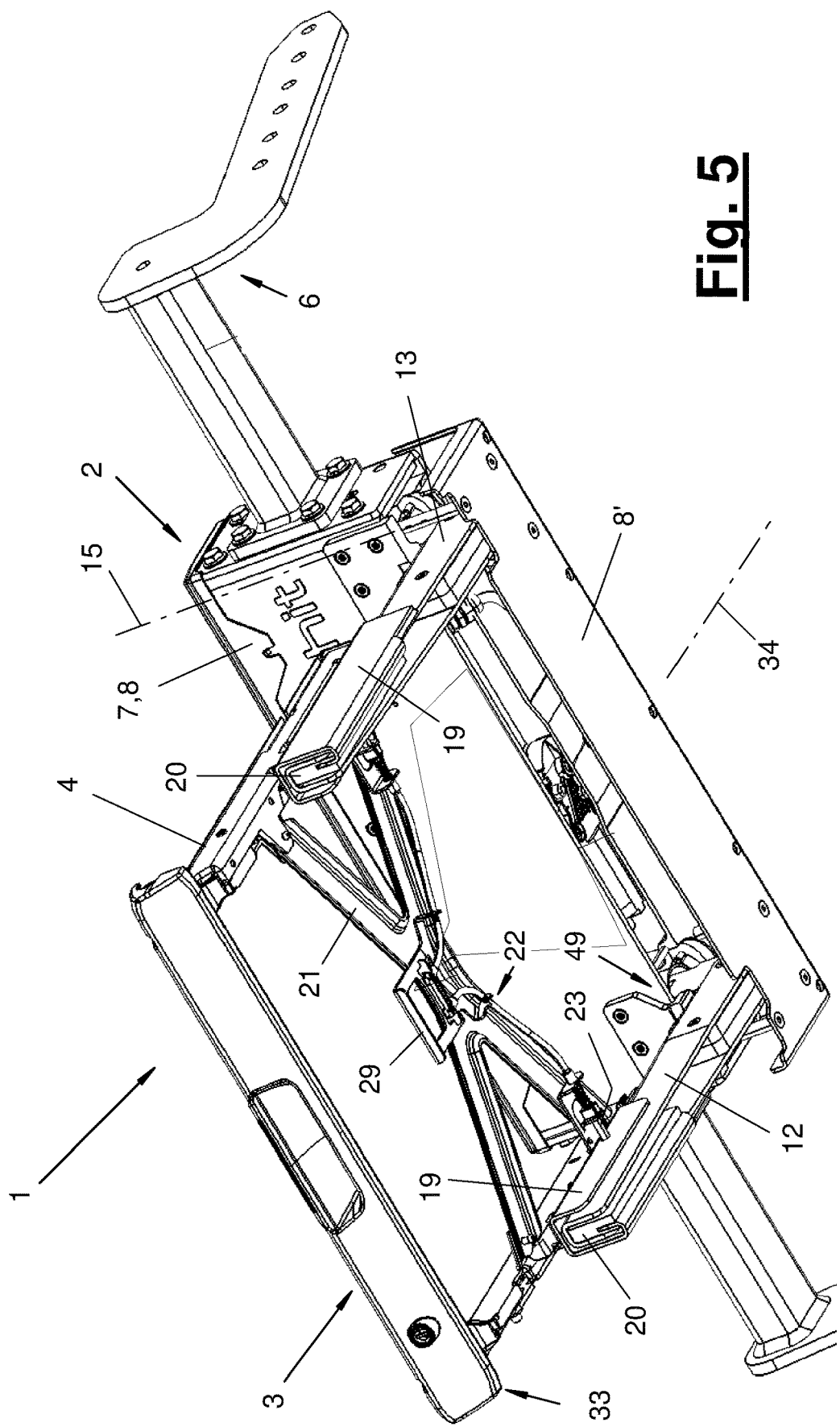
FIG. 5 is a perspective view of the arrangement.
Figure 14:
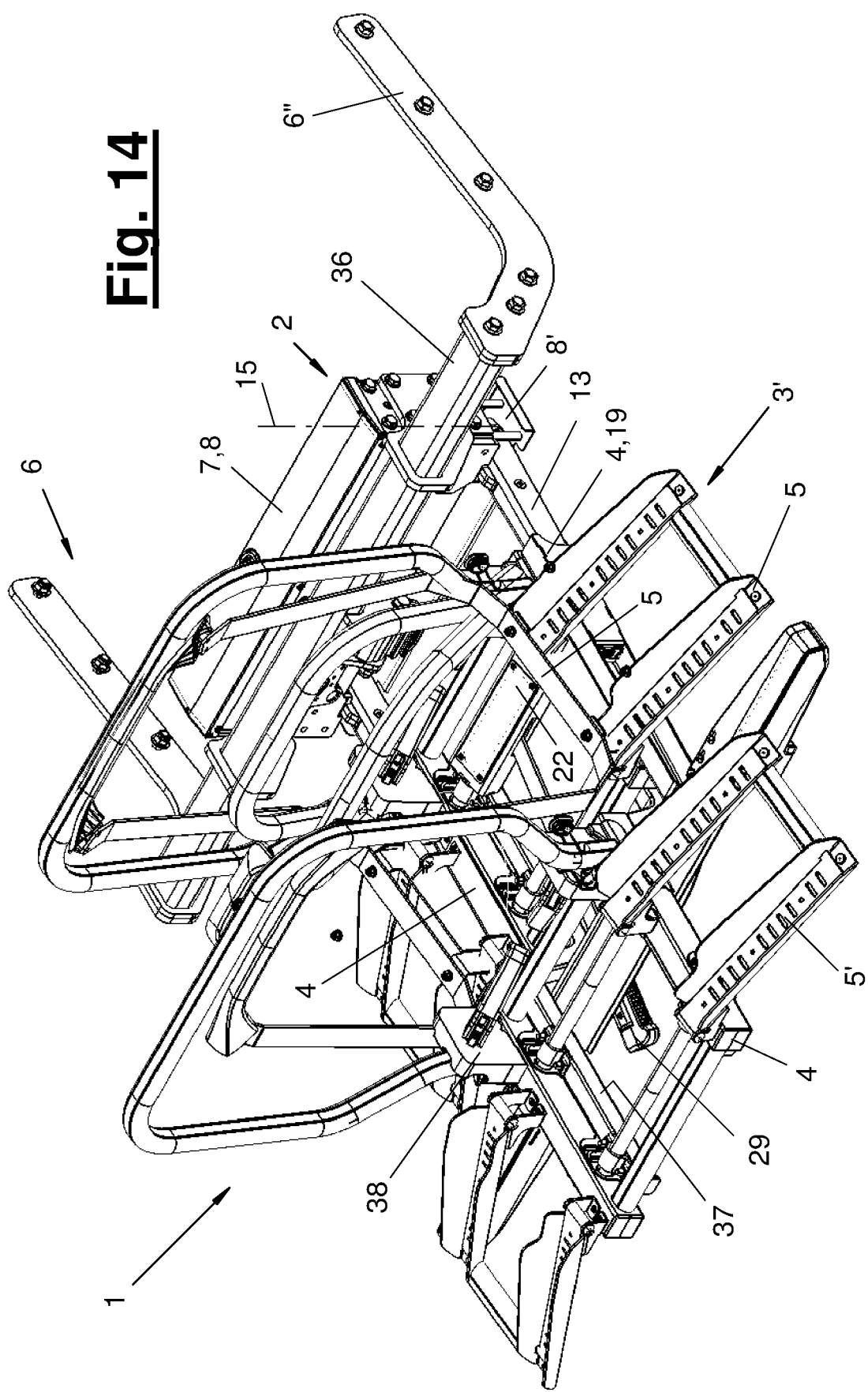
FIG. 14 is a perspective view showing a variant of the load carrier from FIG. 10 with other loads in one of different views.
Figure 15:
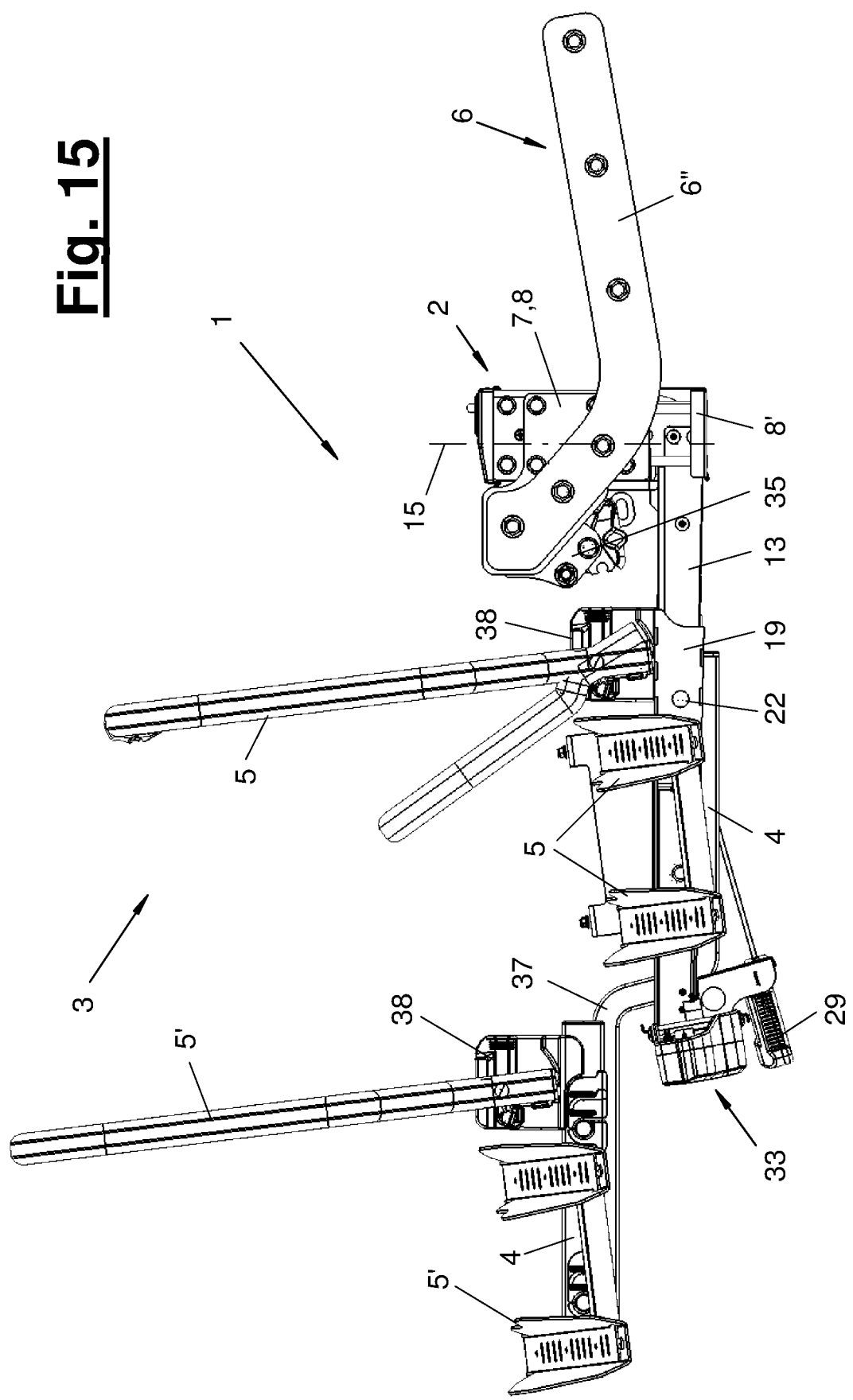
FIG. 15 is a side view showing a variant of the load carrier from FIG. 10 with other loads in one of different views.
Figure 16:
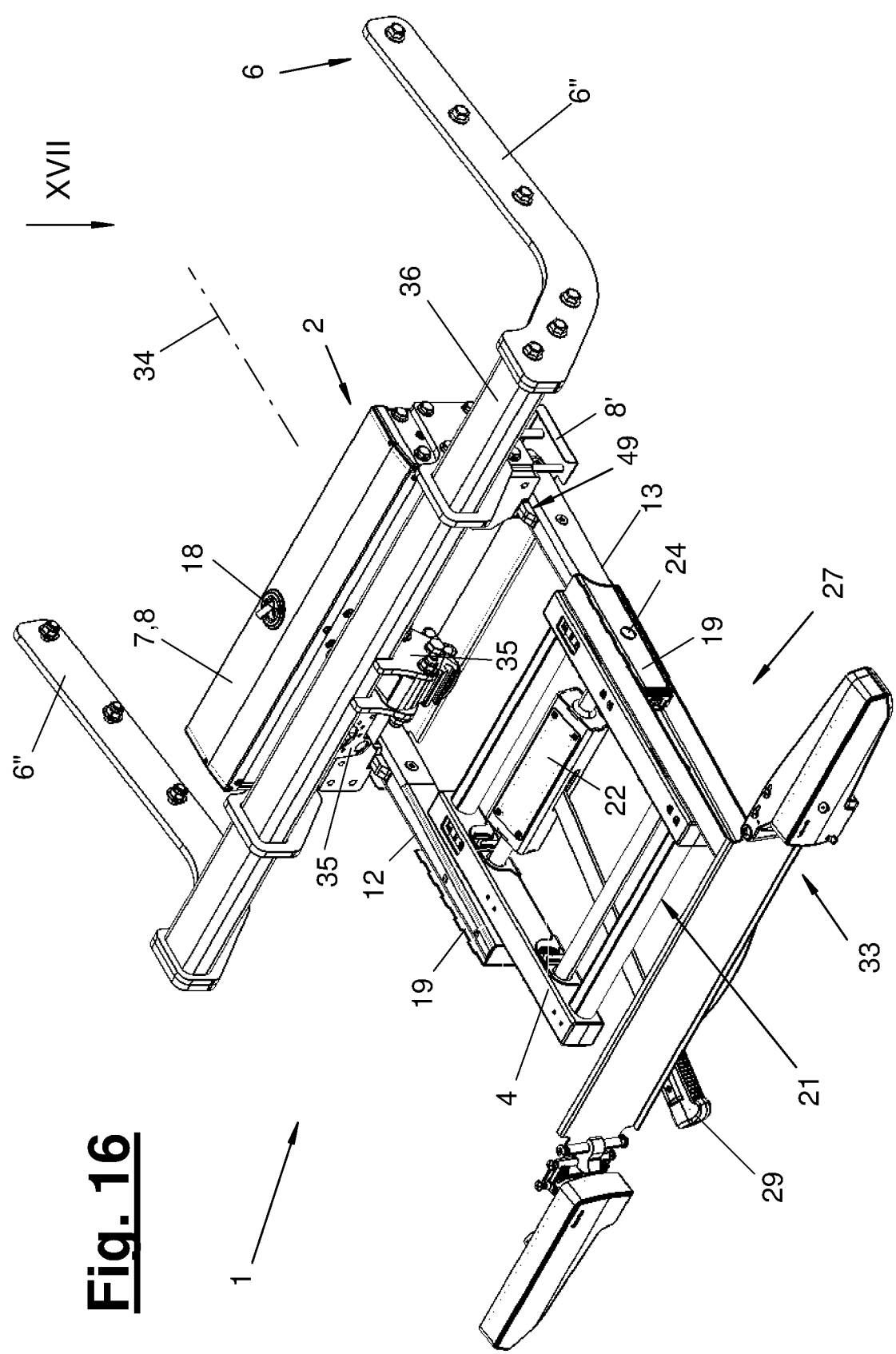
FIG. 16 is a perspective view of a base part and of individual components of a carrier part of the load carrier from FIG. 10.

As is shown in FIG. 3, the vertical axis (15) may be arranged obliquely in the installation position at the vehicle (25). It may be inclined away from the adjacent edge of the vehicle, e.g., from the rear of the vehicle shown in FIG. 3, in the direction of the front of the vehicle. As an alternative, a vertical axis orientation shown in FIGS. 14, 15 and 20 is possible.

The support arms (12, 13) are oriented at right angles to the vertical axis (15). The support arms (12, 13) may have parallel vertical axes (15). The support arms (12, 13) and the vertical axes (15) are arranged at laterally spaced locations at the base part (2). They are located each at a lateral edge area or corner area of the base part (2). In the rear arrangement shown at the vehicle (25), the base part (2) extends at right angles to the vehicle longitudinal axis (34) and along the rear of the vehicle. The vertical axes (15) and the support arms (12, 13) are located at spaced locations from one another in this direction. The support arms (12, 13) may always be arranged at the same level in the vertical direction.

The vertical axes (15) may be arranged at the same level when viewed in the longitudinal direction (34) of the vehicle (25) or have an axial offset, not shown. In case of an axial offset, the support arms (12, 13) located at the same level may be in the pivoted-in position in the longitudinal direction (34) one behind another and next to one another. There may be a predefined sequence of motions and pivoting during the pivoting in and out of the support arms (12, 13) about their respective vertical axis (15).

Figure 22:
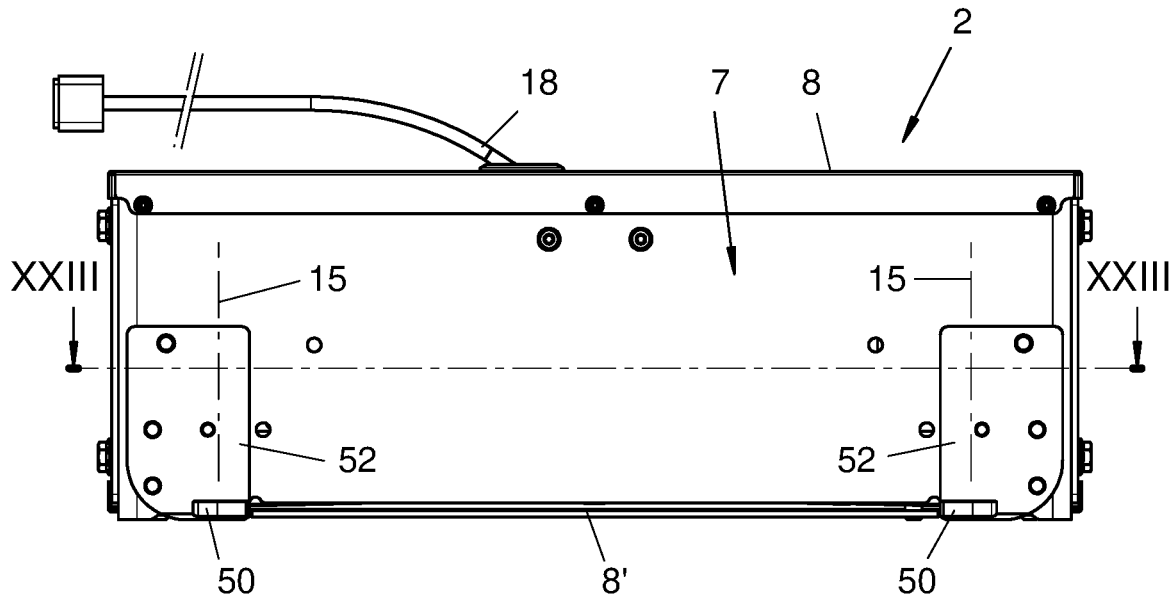
FIG. 22 is a side view showing another variant of the load carrier and the base part thereof in one of different operating positions.
Figure 23:
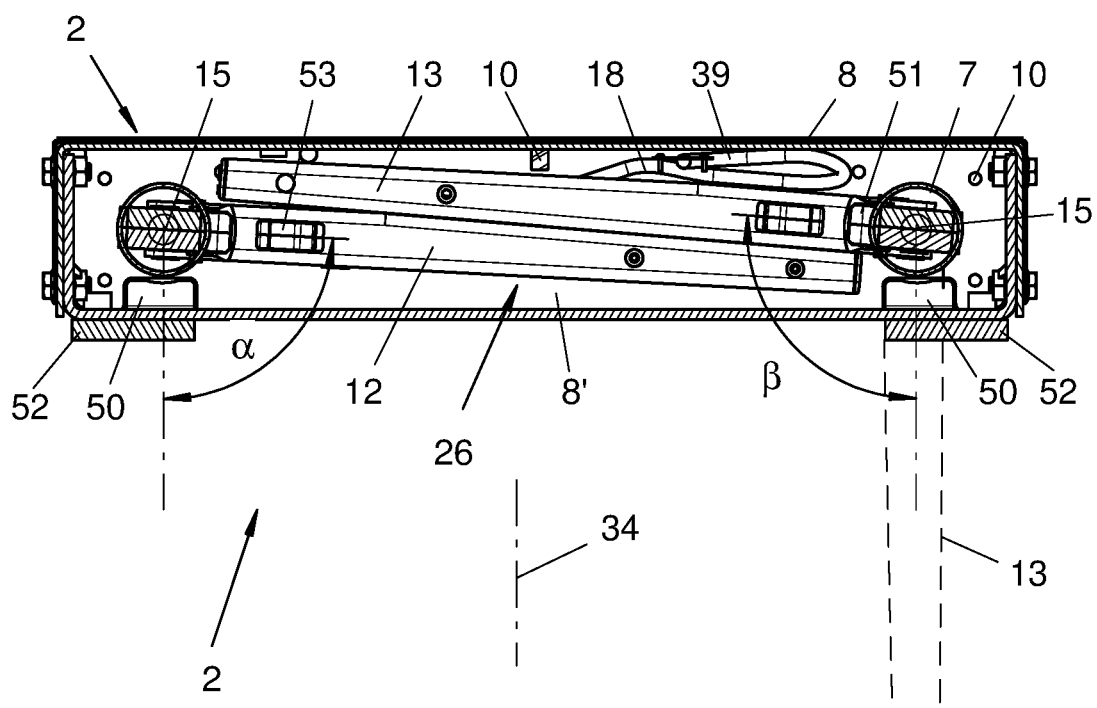
FIG. 23 is a cut-away view taken along line XXIII-XXIII of FIG. 22.
Figure 24:
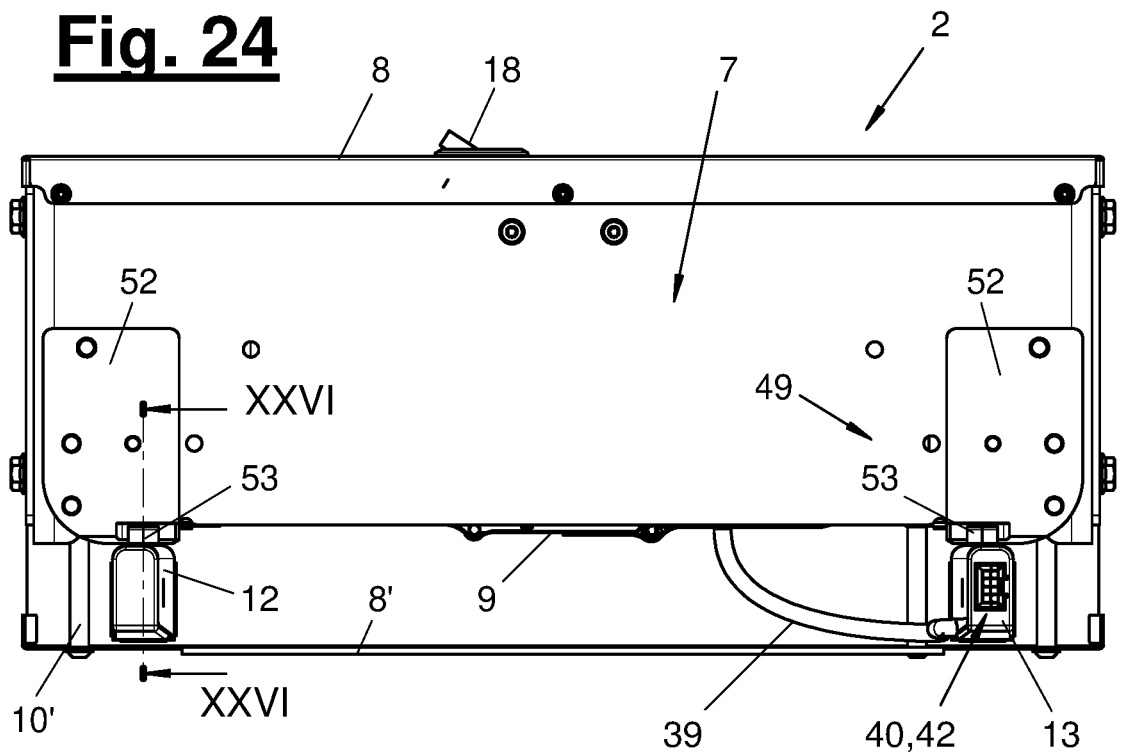
FIG. 24 is a side view of the other variant of the load carrier and the base part thereof in a different operating position.
Figure 25:
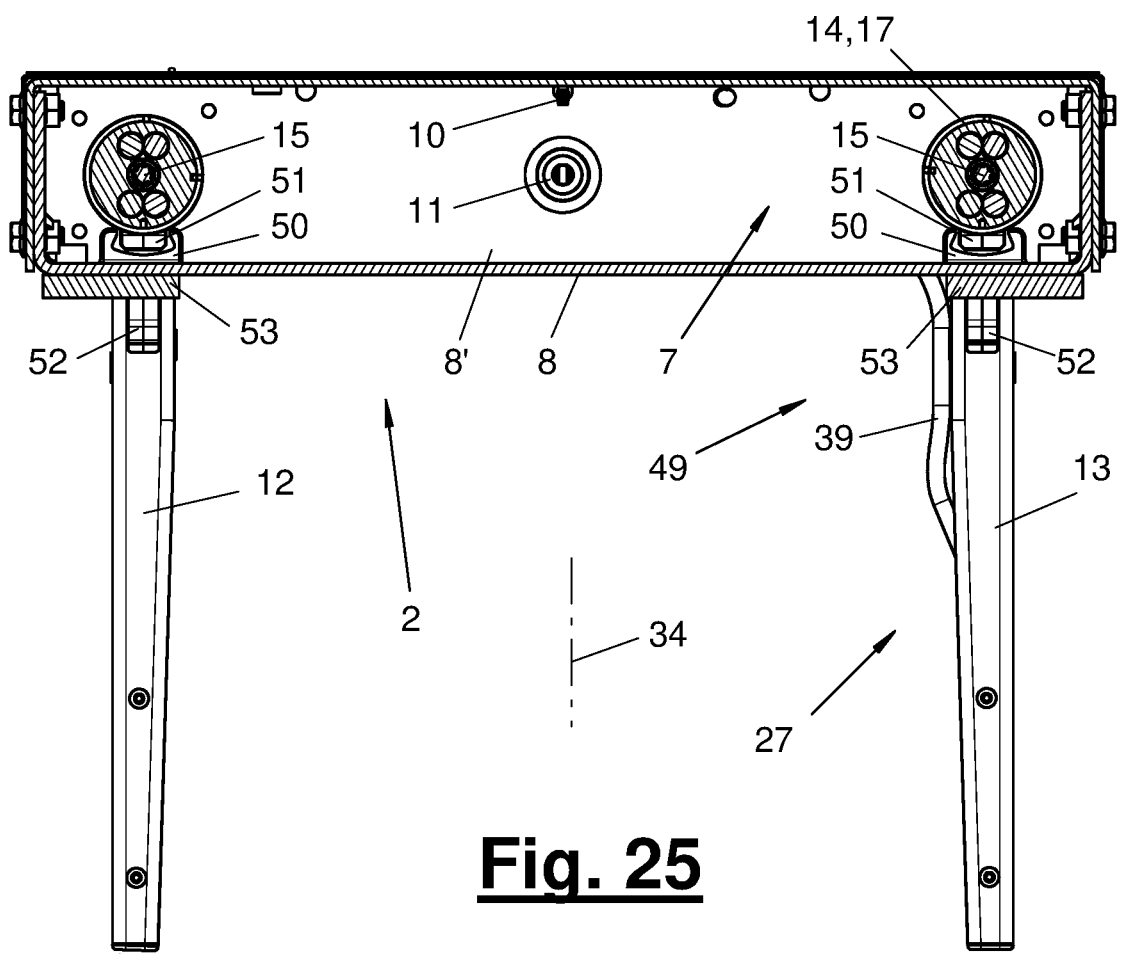
FIG. 25 is a cut-away view of the variant of FIG. 24 of the load carrier in the different operating position.
Figure 27:
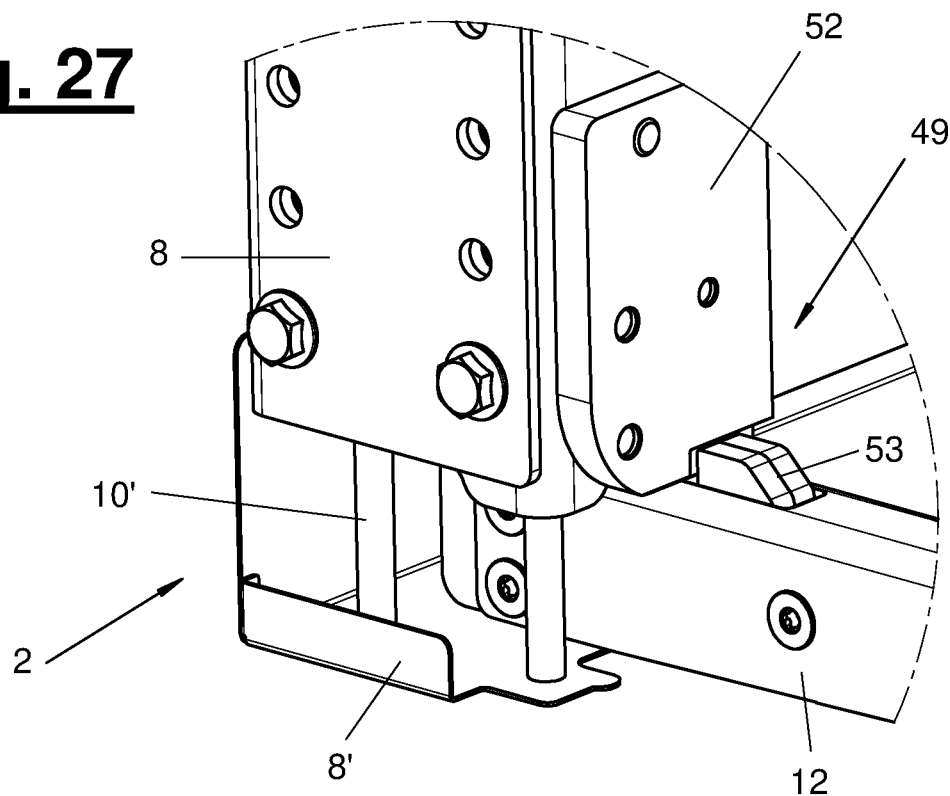
FIG. 27 is a perspective detail view of the variant of FIG. 24.
Figure 26:
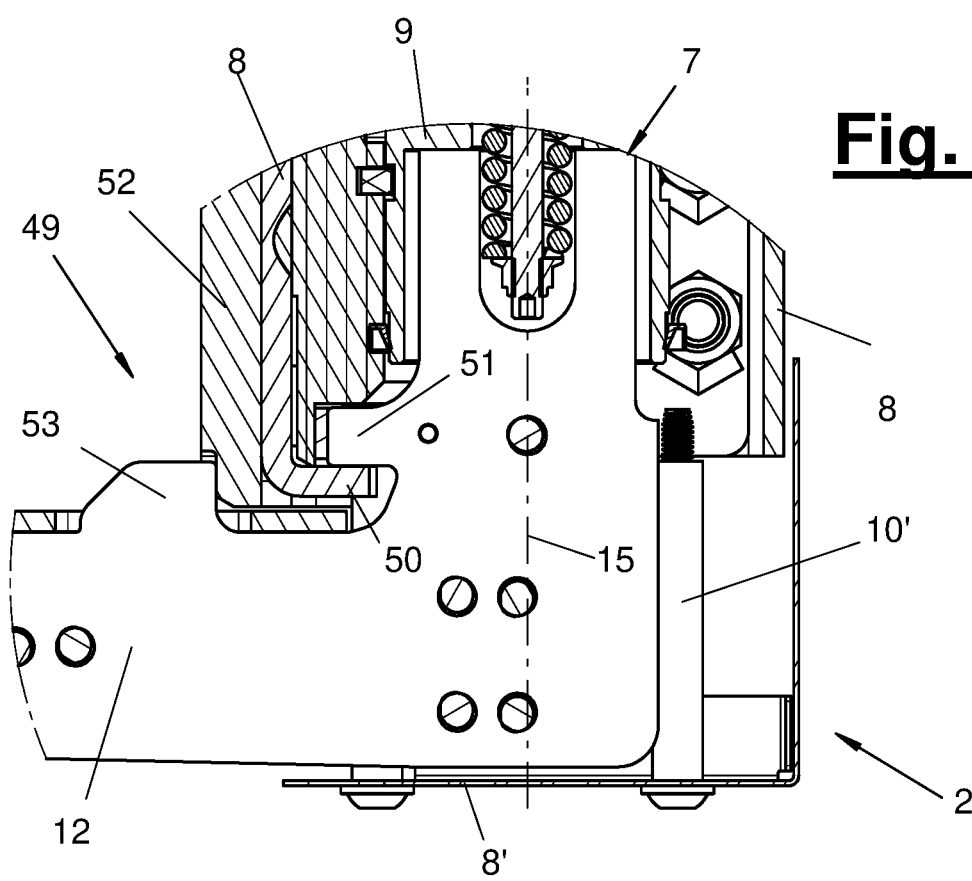
FIG. 26 is a cut-away detail view taken along line XXVI-XXVI of FIG. 24.

FIGS. 22 through 25 show a variant of the configuration of the support parts, which likewise makes it possible for the support arms (12, 13) to be located next to one another in the pivoted-in position. FIG. 22 shows a front view of the base part (2) and FIG. 23 shows a section in the top view according to section line XXIII-XXIII from FIG. 22. A front view is shown in FIG. 24 and a corresponding cut-away top view is shown in FIG. 25. FIG. 26 shows a cut-away view along the section line XXVI-XXVI from FIG. 24. FIG. 27 is a detail view for FIG. 24 and shows as a detail a housing corner and a pivoted-out as well as supported support arm (13).

The vertical axes (15) are arranged, when viewed in the longitudinal direction (34) of the vehicle (25), at the same level. The support arms (12, 13) have a conical shape tapering towards the free end of the arm in the top view, and they pivot over different pivot angles (?, ?) about their respective vertical axes (15) or pivot axis. For example, the one support arm (12) located in the rear in the pivoted-in position pivots, e.g., over an angle (?) of less than 90°, e.g., about 87°. The other support arm (13) located in the front in the pivoted-in position pivots, e.g., over an angle (?) of greater than 90°, e.g., about 95°.

Figure 8:
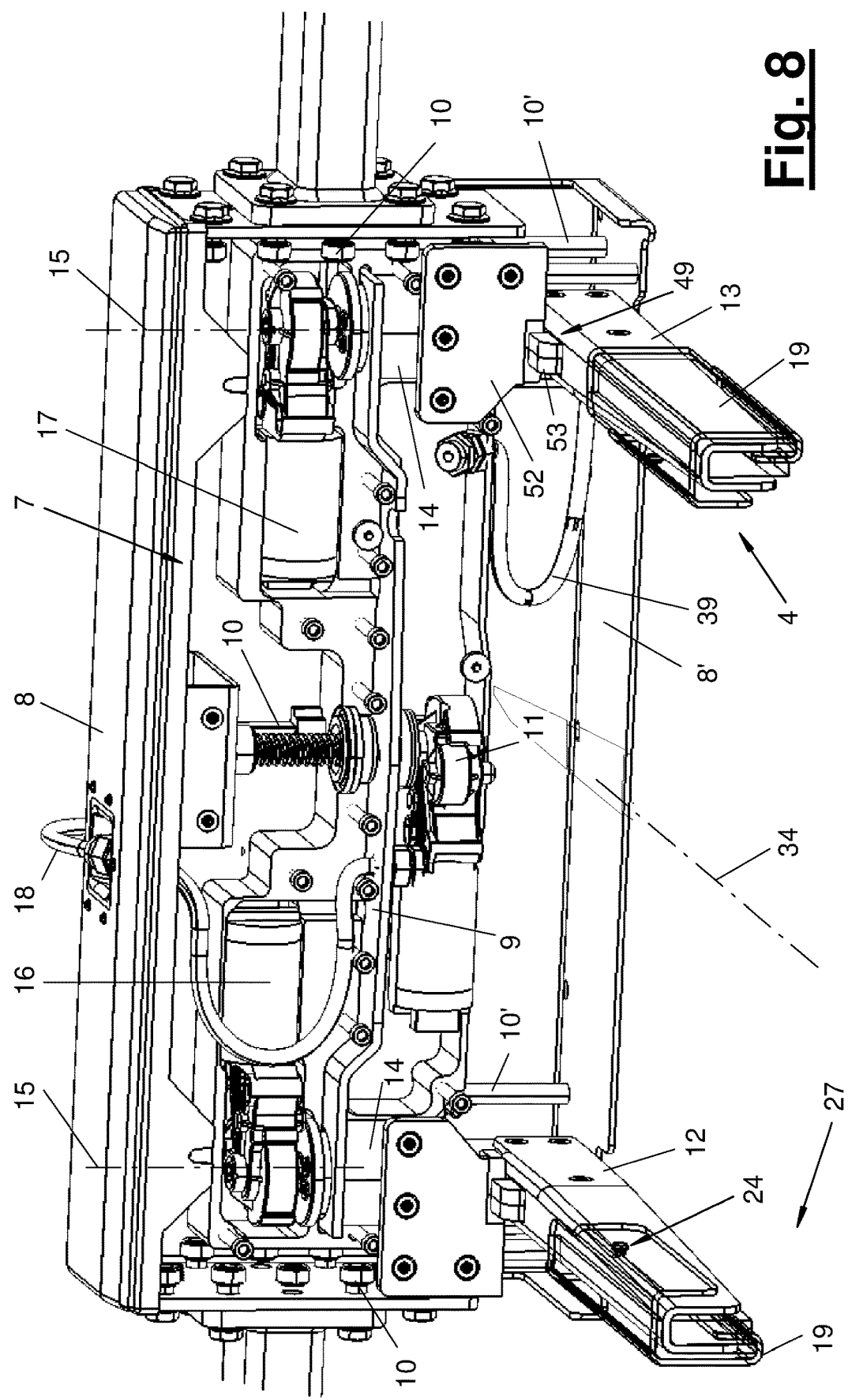
FIG. 8 is a perspective and cut-away view of the arrangement according to FIG. 7.
Figure 9:
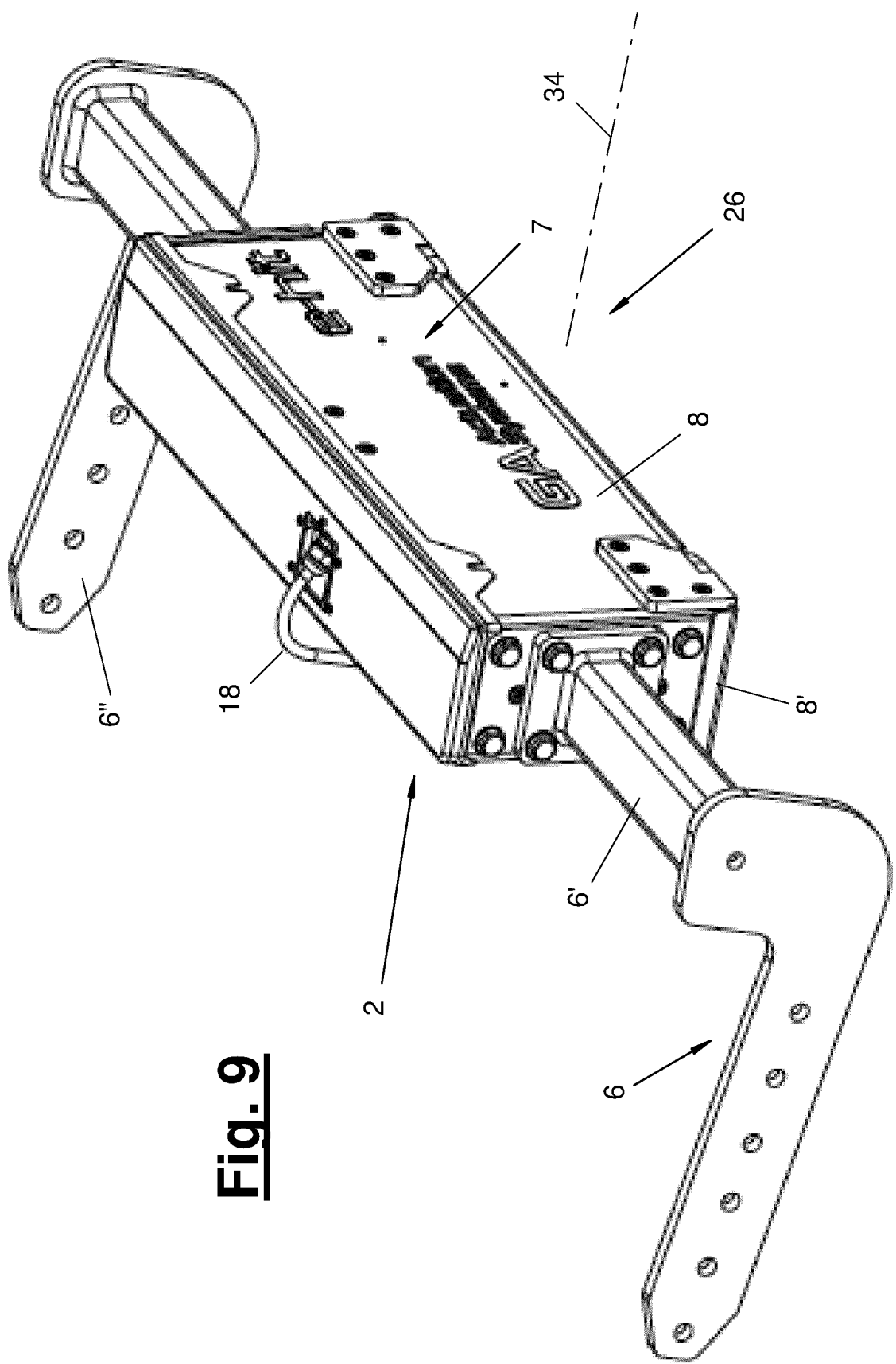
Figure 10:
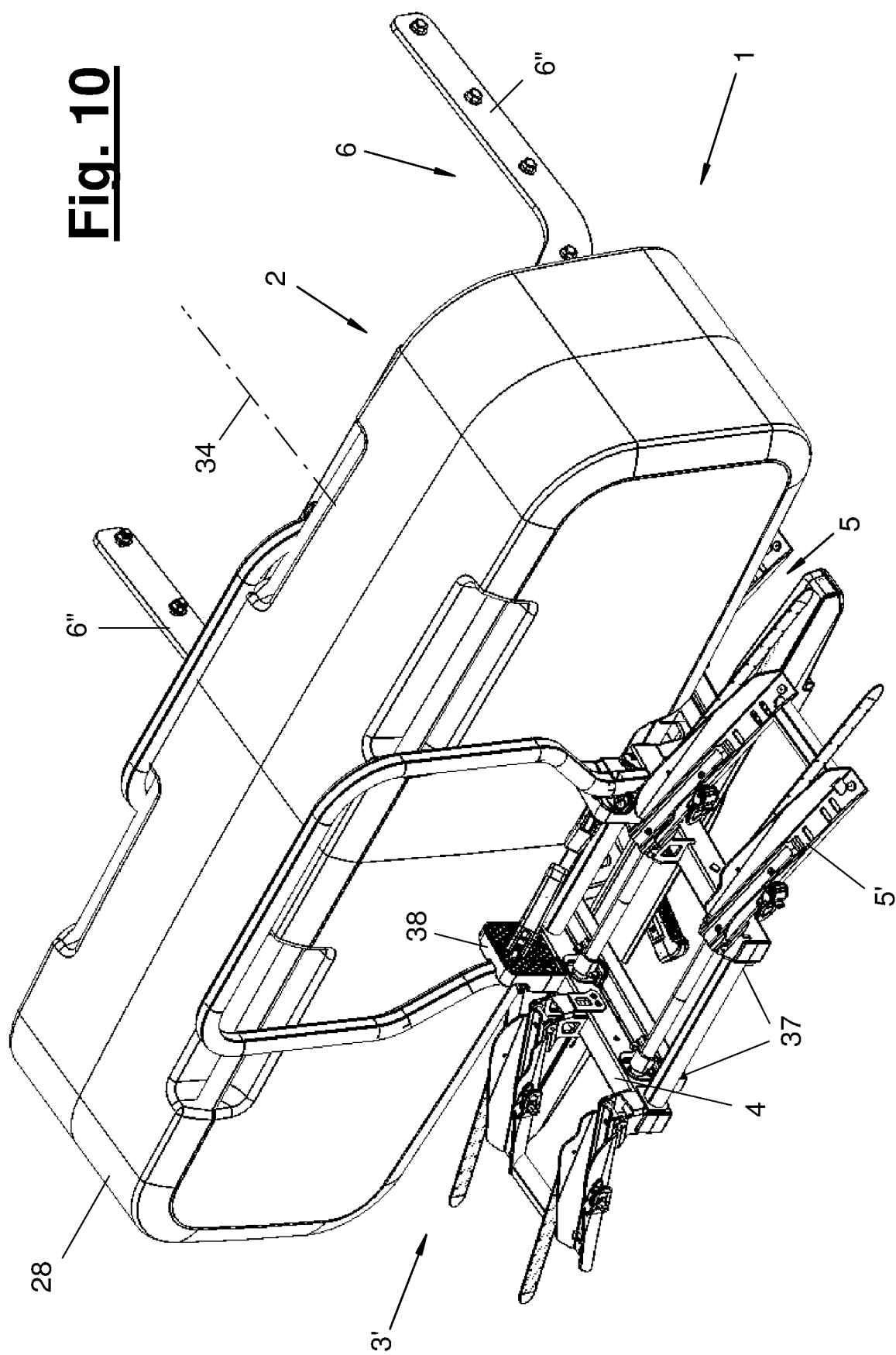
FIG. 10 is a perspective view showing a variant of the load carrier with different loads.
Figure 11:
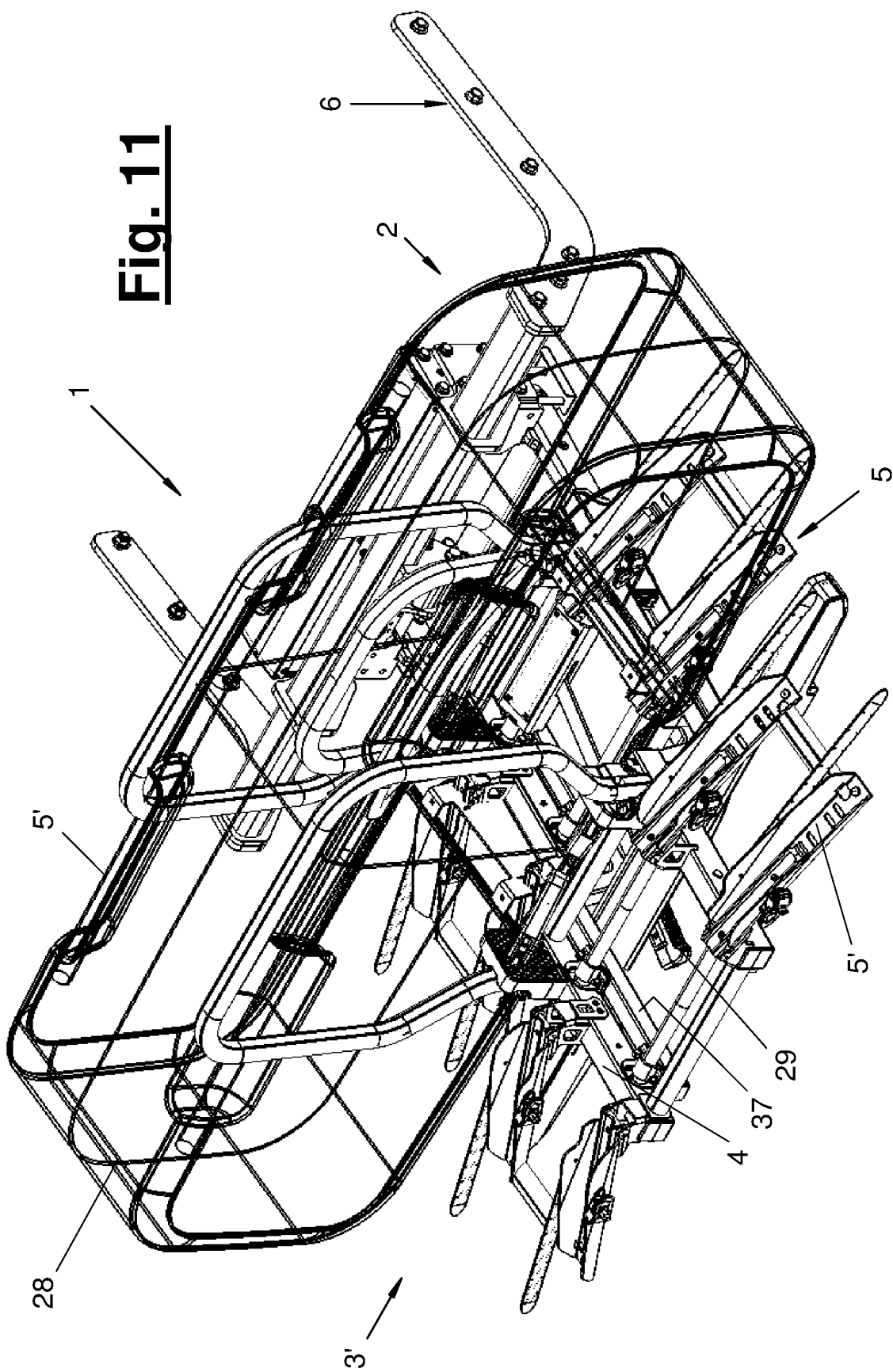
FIG. 11 is a transparent view of the load carrier from FIG. 10.
Figure 12:
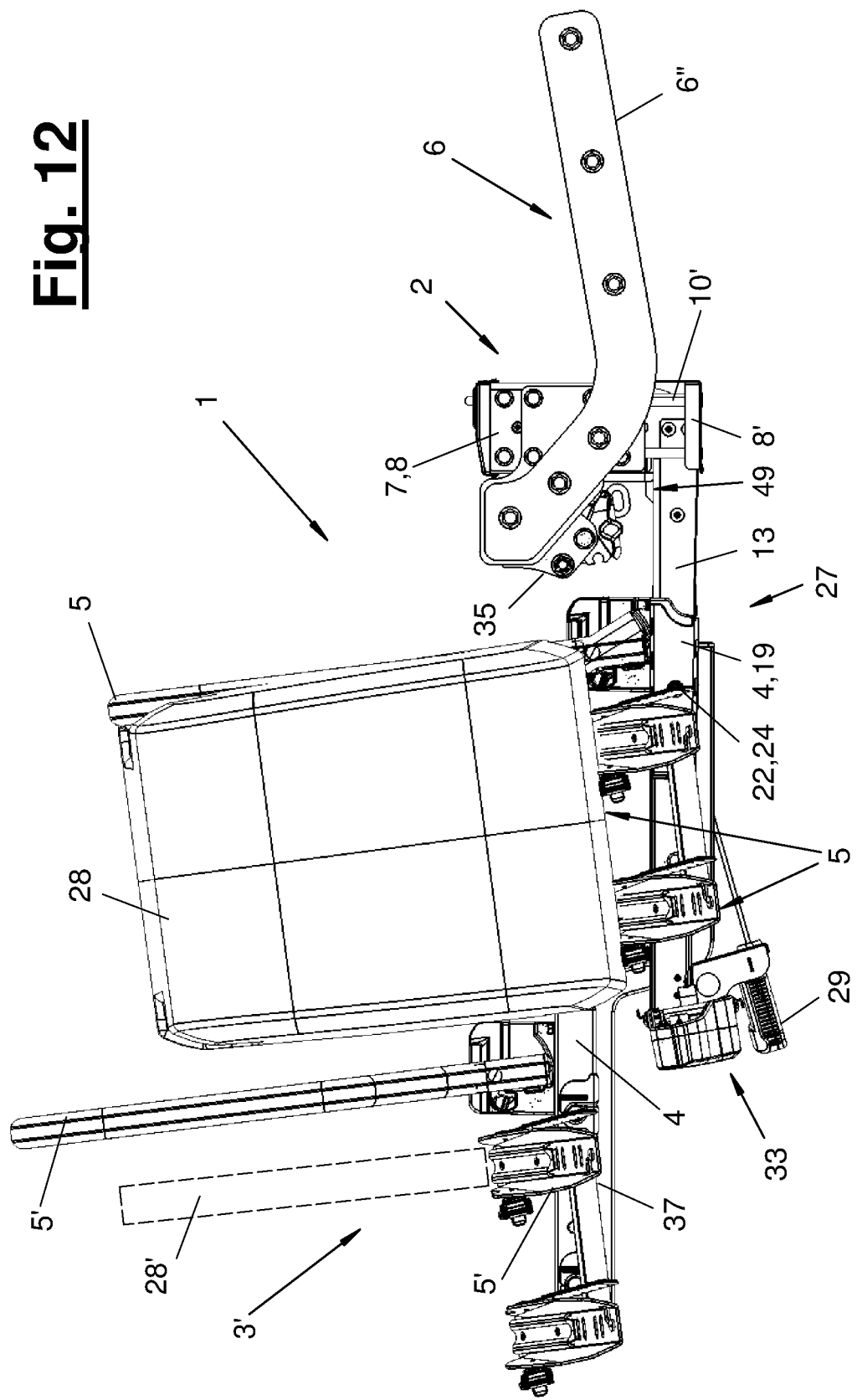
FIG. 12 is a side view and a bottom view of the load carrier from FIG. 10.
Figure 13:
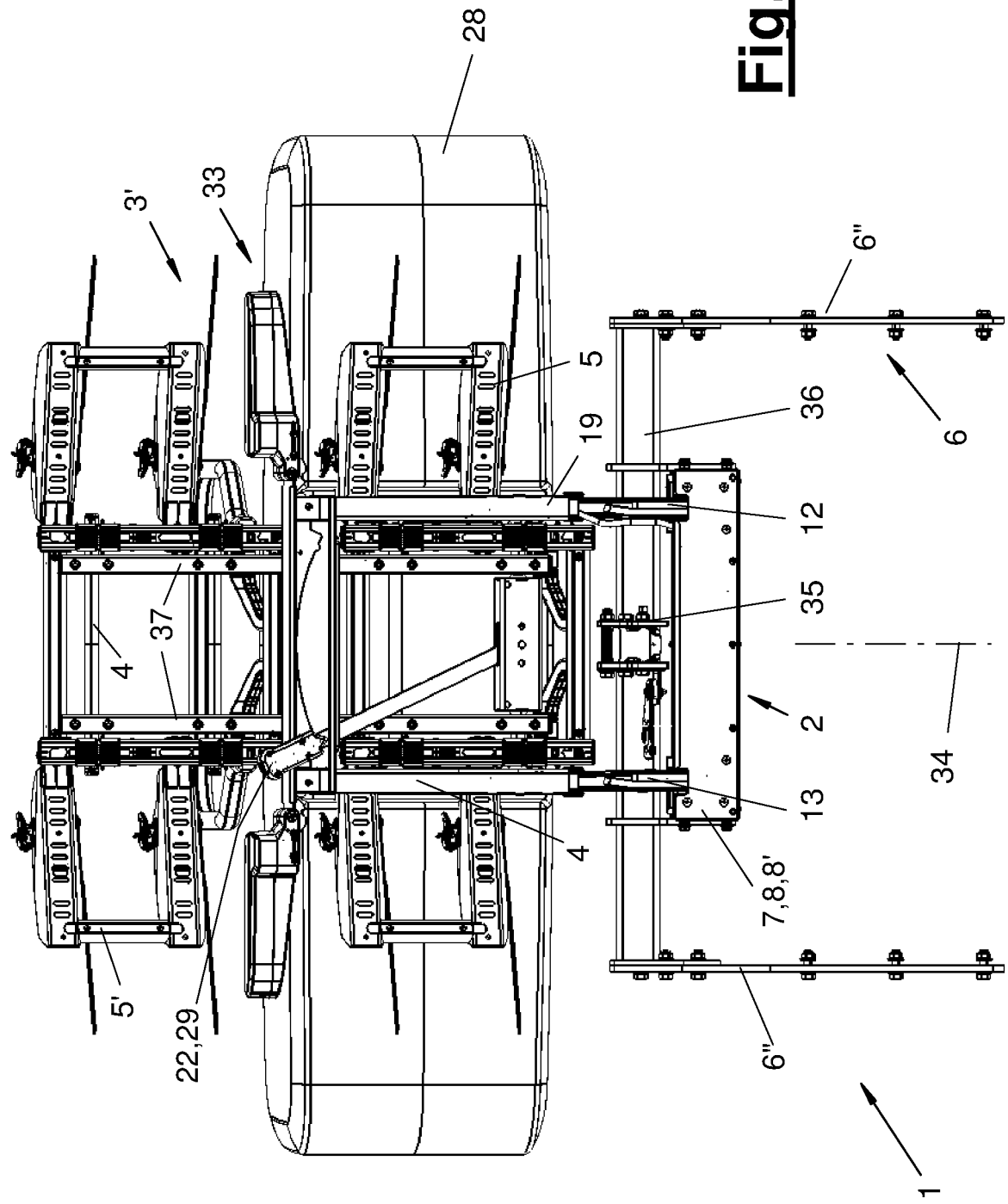
FIG. 13 is a bottom view of the load carrier from FIG. 10.

The support arms (12) can be moved between a use position (27) shown in FIGS. 1 through 8 as well as 24 and 25 and an out-of-use position (26) shown in FIGS. 9, 22 and 23.

The support arms (12, 13) are lowered along the vertical axes (15) and then pivoted out about their respective vertical axis (15) during a motion out of the out-of-use position (26) into the use position (27). A reverse order of motions is obtained for assuming the out-of-use position.

The support arms (12, 13) are pivoted in, in the out-of-use position (26), and are arranged concealed on the underside of the vehicle (25). The support arms (12, 13) are pivoted out in the use position (27) and project ever the adjacent edge of the vehicle. This is, e.g., the rear of the vehicle in FIGS. 3 and 20.

The pivoting motion into the use position (27) takes place according to FIGS. 3 and 20 under the edge of the vehicle, especially under a rear bumper of the vehicle (25). The pivoted-in support arms (12, 13) are lifted in the out-of-use position (26) and can be located concealed and above the edge of the vehicle, increasing the ground clearance. The lifting and lowering paths along the vertical axes (15) are selected correspondingly.

In addition, the support arms (12, 13) may be directed horizontally or obliquely upwards in a pivoted-out operating position (27). FIGS. 3, 12, 15 and 20 illustrate these orientations in the side view. The vertical axis (15) has an oblique position in this oblique orientation of the support arm.

The support arms (12, 13) have a straight orientation in the preferred embodiment. Their shape may be configured to be favorable for the load. The support arms (12, 13) may have, especially according to FIG. 8, a conical shape, which tapers towards the free end of the arm, in their longitudinal extension and in the top view. The support arms (12, 13) may have any desirable and suitable cross-sectional shape. They may be configured, e.g., as downwards open U sections or as circumferentially closed box sections.

The base part (2) has a lifting and pivoting device (7) for the support arms (12, 13). The support arms (12, 13) can perform the above-described kinetics with this lifting and pivoting device (7).

The base part (2) has a closable housing (8). The lifting and pivoting device (7) is arranged in the housing (8). In addition, the support arms (12, 13) can be accommodated in the housing (8) in the out-of-use position (26). The support arms (12, 13) project upwards in the use position (27) in the now opened housing (8).

The lifting and pivoting device (7) contains a plurality of motor drives (11, 16, 17) for the vertical and pivoting adjustment of the support arms (12, 13). The motor drives (11, 16, 17) may comprise, e.g., electric motors, especially gear motors.

Further, an energy supply unit (18), which is connected to a suitable energy source, e.g., to the power supply unit of the vehicle (25), especially to the battery thereof, is arranged at the housing (8). FIGS. 1 through 9 and 19 through 22 show this arrangement. The load carrier (1) further contains a plug-type connection (40) for transmitting energy and/or signals between the support arm (12, 13) and the carrier part (3, 3').

The lifting and pivoting device (7) has according to FIG. 8 a vertically adjustable and driven lifting bridge (9), at which the support arms (12, 13) are arranged together and are mounted pivotably by means of pivot bearings (14). The drives (16, 17), especially pivoting drives, of the support parts 12, 13 are also arranged at the lifting bridge (9). The lifting bridge (9) extends lying, especially horizontally, within the housing (8). It is lifted and lowered by a motor-driven lifting drive (11). It is mounted displaceably in parallel along the above-mentioned axes (15) by means of a guide (10). The guide (10) may be formed by roller guides at the lateral housing walls. As an alternative or in addition, it may be formed, e.g., by a vertical rail guide extending parallel to the axes (15) at a housing wall, e.g., at the front wall located in the front in the travel direction (34). FIGS. 8, 23 and 25 show this arrangement.

For example, a movable bottom part (8') of the housing (8) is arranged at the lifting bridge (9) and is spaced apart as well as held by means of stay bars (10'). It is moved along during the vertical adjustment of the lifting bridge (9) and of the support arms (12, 13). The housing (8) is opened on the underside during the lowering motion of the lifting bridge (9), and a free space, through which the support arms (12, 13) can be pivoted out of the housing (8) into the use position (27), is formed between the lowered bottom part (8') and the lower housing edge. FIGS. 3 through 8 as well as 12 through 18 show this lowered position and the use position (27). The bottom part (8') tightly closes the open underside of the housing (8) in the lifted position.

It is possible in another embodiment, not shown, to arrange the bottom part (8') rigidly at the housing (8) and to provide it with a slot-like opening, through which the pivoted-in support arms (12, 13) can be lowered out of the housing and then be pivoted out in the lowered position into the use position (27) unhindered. The pivoted-in support arms (12, 13) can dip in the lifted position into the correspondingly adapted opening in the bottom part (8') and close same.

The base part (2) has a supporting device (49), which is used to support the support arms (12, 13) in the pivoted-out use position (27). The support arms (12, 13) can be supported now at the housing (8) and via the attachment fitting (6) at the vehicle (25). The supporting device (49) can support introduced forces and torques via the support arms (12, 13). The supporting action can again be released when the pivoted-in out-of-use position is assumed. The supporting device (49) may have different configurations. FIGS. 22 through 26 show an advantageous embodiment as an example.

The supporting device (49) has, e.g., vertically acting support elements (50, 51) as well as horizontally acting support elements (52, 53) at the support arms (12, 13) and at the housing (8). The vertically acting support elements (50, 51) are arranged, e.g., in the interior of the housing (8). The horizontally acting support elements (52, 53) may be arranged on the outside. FIG. 26 shows the supporting and meshing position of the support elements (50, 51, 52, 53).

The one vertically acting support element (50) may be formed, e.g., at a respective horizontal stop, especially at a canted structure, at the lower housing edge, which canted structure interacts with a support element (51) at the respective support arm (12, 13), which support element (51) is configured, e.g., as a protruding support lug, which lies on the stop in the support position. The bottom part (8') may have a recess for tightly receiving the support element (50) in the closed position. With the support arms (12, 13) pivoted in, the vertically acting support elements (50, 51) can become unmeshed (disengaged).

The one horizontally acting support element (52) may be arranged on the outer side at the housing wall, especially at the corner area. It may be configured, e.g., as a reinforcing plate and be placed on the housing wall. The other horizontally acting support element (53) may be configured, e.g., as an upright stop boss on the top side of the respective support arm (12, 13). The support elements (52, 53) act in the longitudinal direction (34). They can be caused to mesh and be brought into a stop position when the support arms (12, 13) are pivoted out. The meshing may be positive-locking and also act, e.g., vertically. This can be achieved, e.g., by means of a stepped shape of the stop surfaces of the support elements (52, 53).

The housing (8) is connected to the attachment fitting (6) in a suitable manner. The carrying arms (6') are attached laterally to the housing (8) in the embodiments according to FIGS. 1 through 10. The housing (8) is connected to the crossbeam (36) via holding fittings in the embodiments according to FIGS. 10 through 18. According to FIGS. 14 through 17, the housing (8) may be arranged on the longitudinal side of the crossbeam (36), which side points towards the front of the vehicle. The optionally present trailer coupling (35) is mounted at the crossbeam (36) centrally and in the longitudinal direction (34) behind the housing (8).

The embodiments of the load carrier (1) shown in FIGS. 10 through 18 may have the same above-described configuration of the base part (2) with lifting and pivoting device (7), housing (8) and vertical axes (15).

The load carrier (1) has the aforementioned carrier part (3, 3') for receiving a load or charge (28, 28'), which can be detachably connected to the base part (2). The carrier part (3, 3') can be supported on the support arms (12, 13). It may also be connected detachably to the support arms (12, 13) and be fixed in the use position (27) at the support arms (12, 13).

The different carrier parts (3, 3') have the carrying bridge (4) mentioned each and a load support device (5) for a load or charge (28). The carrier part (3') shown in FIGS. 10 through 18 additionally has an auxiliary carrier (37) and an additional load support device (5') for a load (28').

The individual load support device (5) is configured in FIGS. 1 through 9 as a bicycle rack and the load (28) as an arrangement of one or more, e.g., two bicycles. As an alternative, the load support device (5) may have a different configuration. FIGS. 19 through 21 show an individual load support device (5), which is multifunctional and can receive selectively a container (28') or another load, e.g., bicycles.

The additional load support device (5') shown in FIGS. 10 through 18 is configured, e.g., as a bicycle rack and the load (28') as an arrangement of one or more, e.g., two bicycles.

According to FIGS. 10 through 18, the load support device (5) may optionally likewise be configured as a bicycle rack or as a container mount for a load (28) comprising bicycles or a container. Both possible configurations of the load support device (5) and of the load (28) are shown in a joint arrangement for illustration in FIGS. 10 through 13. Only the one load support device (5) for the box or for the bicycles or for another load is usually used in practice.

It is also possible, however, to arrange a plurality of different load support devices (5) one on top of another and to connect them detachably to one another. For example, a load support device (5), e.g., the bicycle rack, may be arranged here at the bottom and be connected to the carrying bridge (4). A second load support device (5), e.g. a box mount, may be detachably arranged and fastened on this first load support device (5). The bicycle rack remains connected here to the carrying bridge (4).

Bicycles and a box may be transported optionally with the carrier part (3") usable in a flexible manner according to FIGS. 10 through 13 or only bicycles or only boxes may be transported according to FIGS. 14 and 15 in a larger number, the number of items being larger, especially double, in this case. If the auxiliary carrier (37) is not used or is removed, an individual box or a smaller number of bicycles may be carried. A load may also have, as an alternative, a different configuration, e.g., as ski or snowboard equipment, as a small motorcycle or the like.

The carrying bridge (4), which is present in both variants of the carrier part (3, 3'), is configured to be connected to the base part (2). It may be supported at and fastened to the base part (2). In particular, the carrying bridge (4) may be connected to the pivoted-out support arms (12, 13). It may lie on the support arms (12, 13) and especially attached to same. The carrying bridge (4) connects the support arms (12, 13), which are pivoted out and are preferably parallel in the use position, at right angles to the longitudinal axis (34) and it supports these mutually. Different embodiments of the carrying bridge (4) are shown in FIGS. 1 through 5 and in FIGS. 10 through 18.

The carrying bridge (4) has on the edge side two oblong support parts (19), which may be detachably connected to a respective support arm (12, 13) each. The support parts (19) have each a respective straight orientation along the axis (34). The support part (19) may lie on the respective support arm (12, 13) over a large part of its length flatly, preferably level. In addition, it can enclose its support arm (12, 13) on one or more additional sides. The support part (19) may have, e.g., a cuff-like configuration and may be attached to the respective support arm (12, 13) from the top or be pushed from the free front end over the respective support arm (12, 13) in the longitudinal direction thereof.

Figure 6:
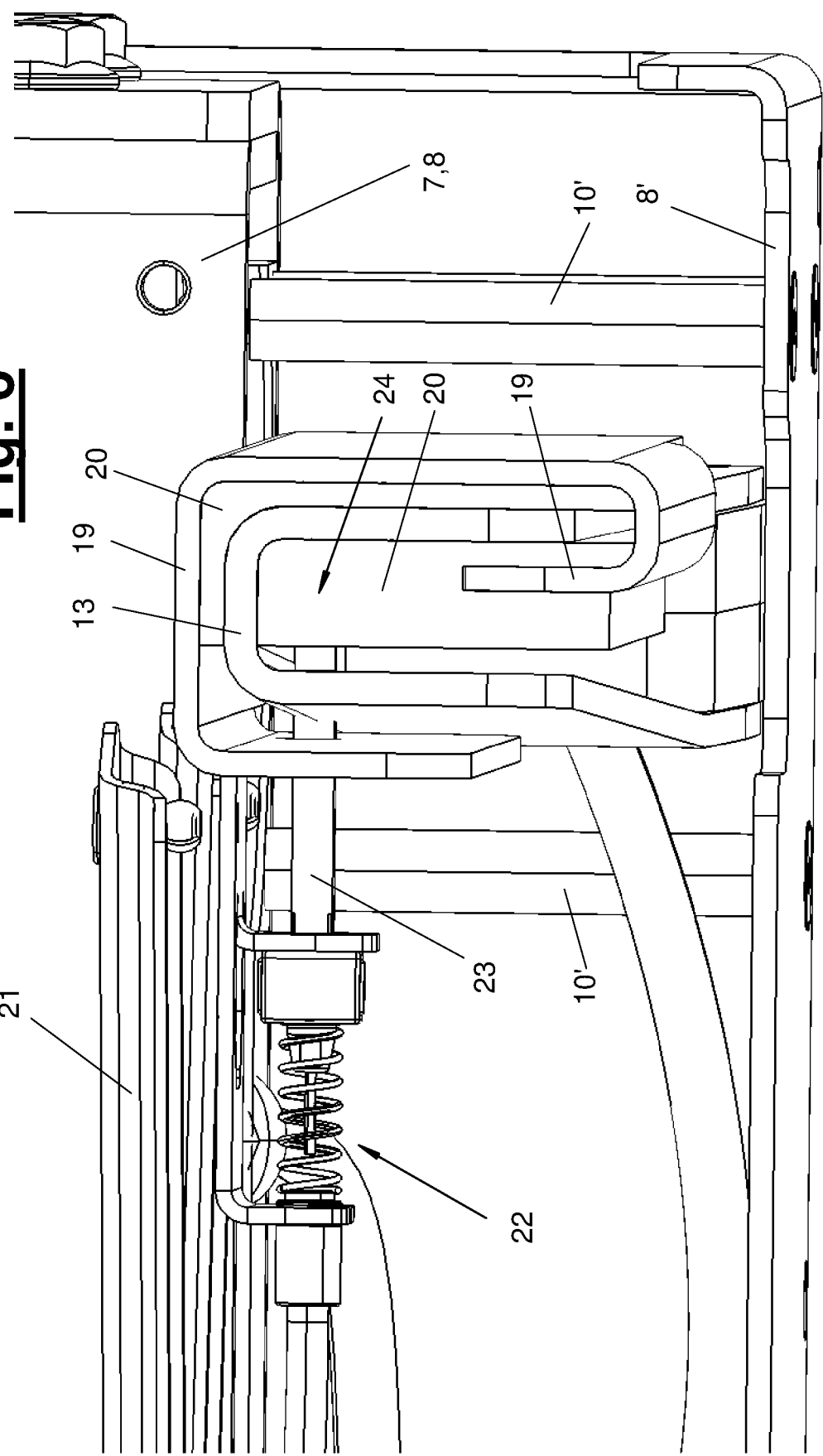
FIG. 6 is a cut-away and enlarged detail view from the end of a support arm.
Figure 7:
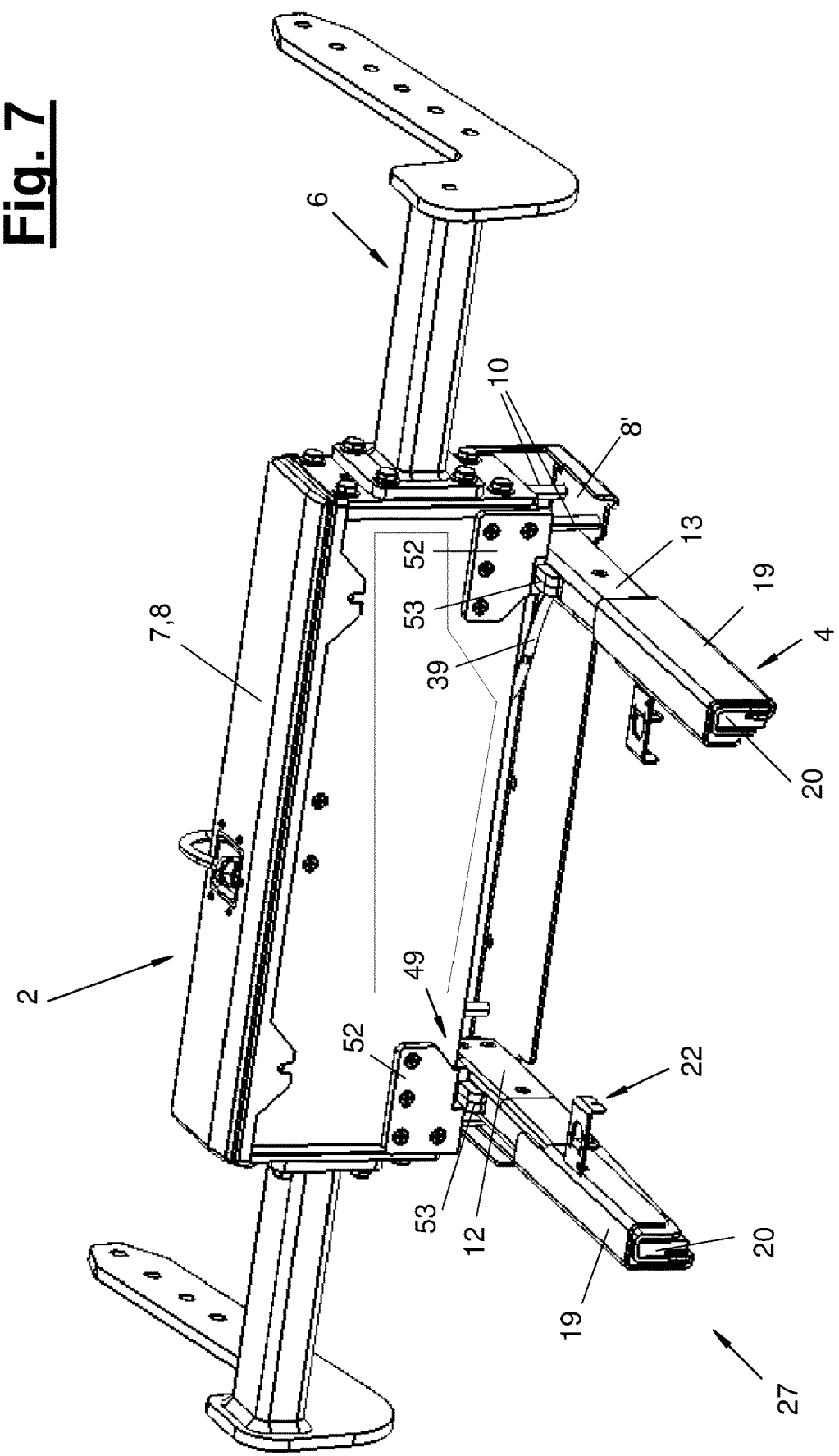
FIG. 7 is a perspective view of the base part with support arms pivoted out.

In the embodiments according to FIGS. 1 through 9, the support part (19) has a guide device (20). This can ensure a multiaxial vertical and lateral guiding and support of the support part (19) at the associated support arm (12, 13). FIG. 6 shows this arrangement in a front view. The guide device (20) can mesh with the U-shaped support arm (12, 13) from below. It can be configured with low friction and as a sliding aid for the front-side attachment to the end of the support arm. The guide device (20) may be mounted at the side wall and at a bent edge or flange of the support part (19). A guide device (20) may optionally be omitted or have a different configuration in the other embodiments according to FIGS. 10 through 18.

The carrying bridge (4) further has a reinforcement (21), which connects the support parts (19) to one another in the transverse direction and supports them in a reinforcing manner. The reinforcement (21) may have a cross-like or X shape, e.g., according to FIGS. 1 through 5. The reinforcement (21) is formed by a plurality of cross struts.

The carrier part (3, 3'), especially the carrying bridge (4), has a detachable locking (22) for the fixing connection and coupling of the carrier part (3, 3') to the base part (2). In particular, the detachable locking (22) is used for the fixing connection and coupling of the carrier part (3, 3') with the support arms (12, 13). The support devices (19) may be used to loosely contact and support the carrier part (3, 3'), especially the carrying bridge (4), on the support arms.

The locking (22) may have different configurations. In the exemplary embodiments shown, the locking acts on the central area of the support arms (12, 13). As an alternative, action at another location is also possible. A locking (22) may also be present, e.g., between the housing (8) and the carrying bridge (4). The locking (22) preferably acts three-dimensionally in the different variants. It offers a corresponding three-dimensional fixation.

The locking (22) is arranged in the exemplary embodiments shown between the carrying bridge (4), especially the reinforcement (21), and the support arms (12, 13).

The locking (22) has an operating part (29), which is arranged at the carrying bridge (4) or at another suitable location, and which acts on one or more movable latches (23), which interact with one or more latch mounts (24) at the support arms (12, 13). Two latches (23) are preferably present on both sides, and they interact with a latch mount (24) each at a support arm (12, 13). The latch mounts (24) may be arranged, e.g., in the central area of the support arms (12, 13).

The latches (23) are moved by the operating element (29) and they mesh with the respective latch mount (24) in a positive-locking manner in the latched position. The latches (23) may be spring-loaded. They move at right angles or obliquely to the longitudinal axis (34) and in opposite directions.

The latch mount (24) may be configured in the simplest embodiment as a passage opening or hole, which corresponds approximately to the dimensions of the latch and into which the latch (23) dips in a positive-locking manner.

Figure 17:
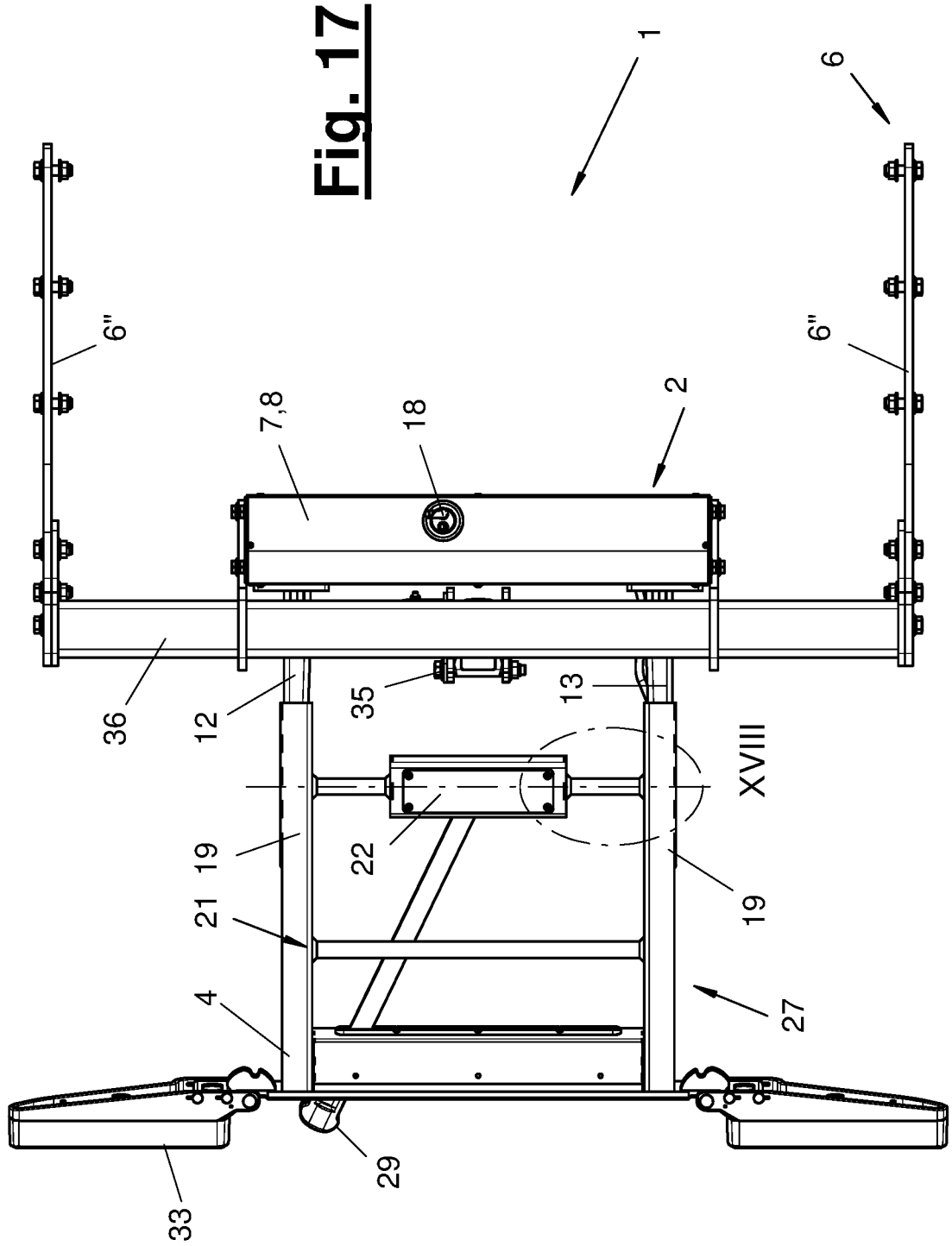
FIG. 17 is a top view of the arrangement from FIG. 16.
Figure 18:
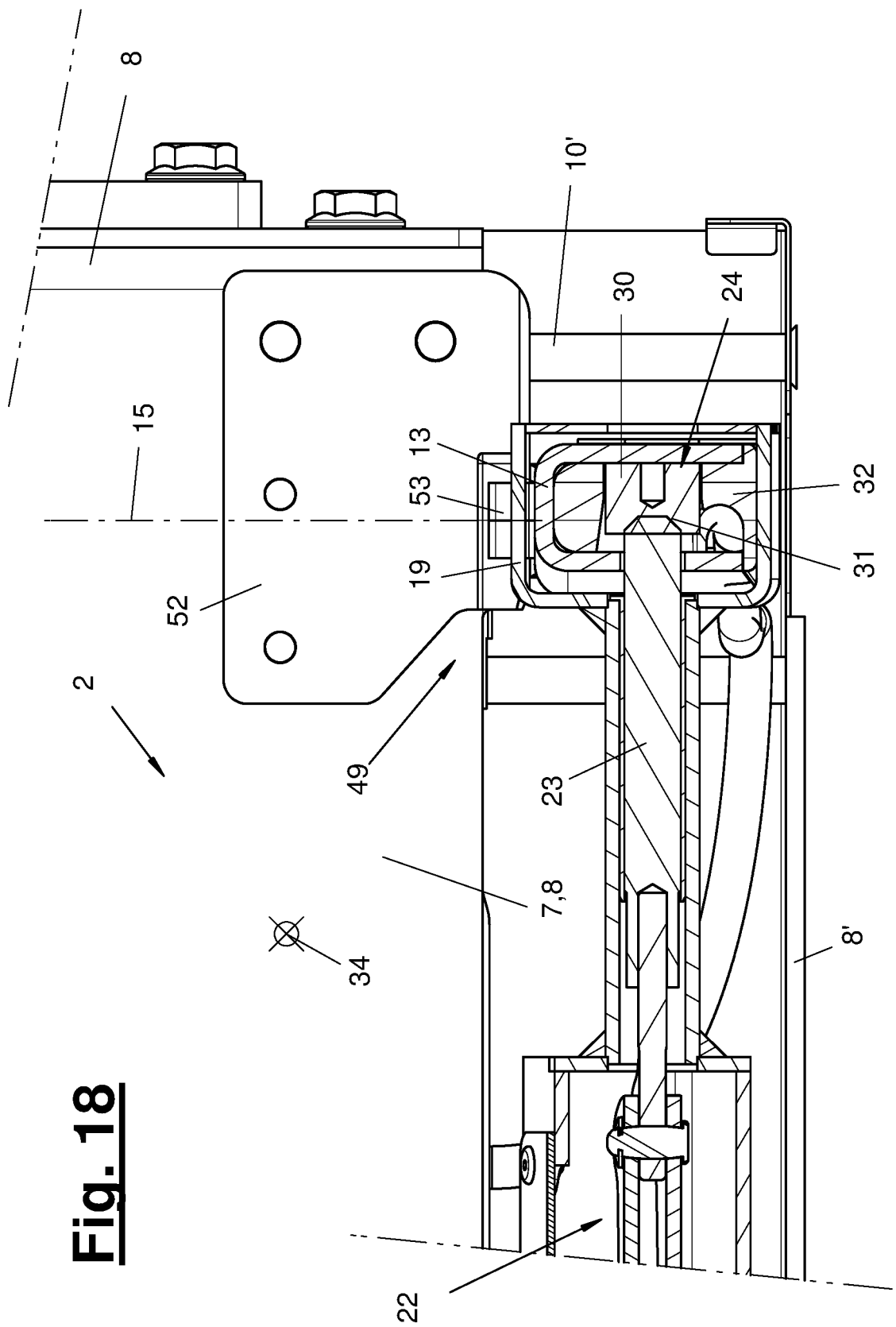
FIG. 18 is an enlarged view of detail XVIII from FIG. 17.

In the embodiments according to FIGS. 10 through 18, the latch mount (24) has a fixing element (30), which is elastically deformable and is located in an enclosing bracket (32). The fixing element (30) undergoes deformation when acted on by the associated latch (23) and is braced as a result in the enclosing bracket (32). This is formed in the respective support arm (12 13). FIGS. 17 and 18 illustrate this embodiment.

The fixing element (30) may consist, e.g., as a compressible molding, of rubber, polyurethane or another suitable material, especially a polymer. It may have, e.g., an opening (31), especially a blind hole, extending along the latch (23). The latch (23), moved forward during the closure of the locking (22), can dip with its conical tip into this opening (31). It can compress and deform now the fixing element (30) in all three translatory space axes.

The latch (23) passes through a corresponding opening in the support part (19). The latch (23) and the fixing element (30) are fixed mutually three-dimensionally and the fixing element (30) clamped in the bracket (32) is fixed three-dimensionally in relation to the respective support arm (12, 13) and is guided in a positive-locking manner.

The carrier part (3, 3') may have a light carrier (33) at the rear end. A license plate may also be fastened to this. The light carrier (33) may be arranged permanently or detachably at the rear end of the carrying bridge (4). The light carrier (33) may also have a retractable configuration. The auxiliary carrier (37) with the load (28') may project beyond the light carrier (33) rearward in the axial direction in case of a multi-position carrier part (3').

The load carrier (1) and its base part (2) as well as its connected carrier part (3, 3') can be supplied with power via the energy supply unit (18). A line (39) can be installed along a support arm (12, 13) to a socket (42) from the housing (8), and a plug (41) can be inserted into the socket (42) when a carrier part (3, 3') is installed. This may take place possibly automatically. The socket (42) may be arranged on the front side of a support arm (12, 13) and the plug-in part (41) at a support device (19). The arrangement may also be reversed.

The above-mentioned plug-type connection (40) is shown in different embodiments in FIGS. 26 through 36. The plug-type connection (40) is used for the above-mentioned transmission of energy and/or signals between at least one support arm (12, 13) and the carrier part (3, 3'), especially the support part (19) thereof.

The plug-type connection (40) is located in the area of the mechanical connection location between the support arm (12, 13) in question and the support part (19). Only one plug-type connection (40) is present and it is associated with a support arm (13) in the exemplary embodiments shown.

As is shown in FIGS. 28 through 33, the plug-type connection (40) is arranged outside of the vehicle contour in the use position (27) of the extended or pivoted-out support arms (12, 13). It is preferably located at a spaced location behind the outer contour of the vehicle, especially behind the rear of the vehicle.

The support part (19) is configured for a positive-locking and preferably pluggable fastening at the respective support arm (12, 13). The support part (19) has an oblong arm mount (19") in the embodiment according to FIGS. 28 through 36. The arm mount (19") has a straight sleeve or tube shape in the exemplary embodiments and is plugged onto the pin-like support arm (12, 13). The arrangement may also be reversed, in which case the support arm (12, 13) has a tubular shape or a sleeve shape and the arm mount (19") has a pin-like configuration.

The plug-type connection (40) preferably has an electric configuration. As an alternative, a different possibility of connection and transmission for energy and/or signals is possible. The plug-type connection (40) has two or more plug-in parts (41, 42), which can be detachably connected to one another. Energy and/or signals are transmitted electrically and conductively when the plug-in parts (41, 42) are connected. The plug-in parts (41, 42) may mesh with one another in a positive-locking manner when connected. One plug-in part (41) is arranged at the support arm (12, 13) and another plug-in part (42) to be connected is arranged at the carrier part (3, 3'), especially at the support part (19).

The plug-in parts (41, 42) have each a multipolar configuration. One plug-in part (41) is configured as the plug and the other plug-in part (42) as a socket in case of a positive-locking connection. The plug (41) is arranged in the sleeve-like arm mount (19") in the preferred embodiment. The socket (42) is located at the corresponding support arm (12, 13). The plug-in parts (41, 42) are arranged in the embodiments according to FIGS. 28 through 36 on the front side at the arm mount (19") and at the support arm (12, 13) and are oriented in the plug-in direction and in the direction of the arm, respectively.

A linear plugging motion is carried out when the carrier part (3, 3'), especially the arm mount (19"), is fastened to the support arm (12, 13), and the arm mount (19") is pushed over the support arm (12, 13). This is a guided relative motion. The plug-type connection (40) is also closed during the mechanical plugging together; in particular, the plug (41) with its contact pins is inserted into the receiving openings of the socket (42).

The plug-type connection (40) is configured to be able to yield elastically. A mount (43) with a spring (44) is arranged at least at one of the plug-in parts (41, 42) to be connected to make an elastic yielding possible.

As is shown in FIGS. 28 through 36, e.g., the plug-in part (41), especially the plug, is arranged at the arm mount (19") such that an elastic yielding is possible. The arm mount (19") is open at its front end facing the base part (2) and is closed with a traverse wall at its rearward front end.

Figure 34:
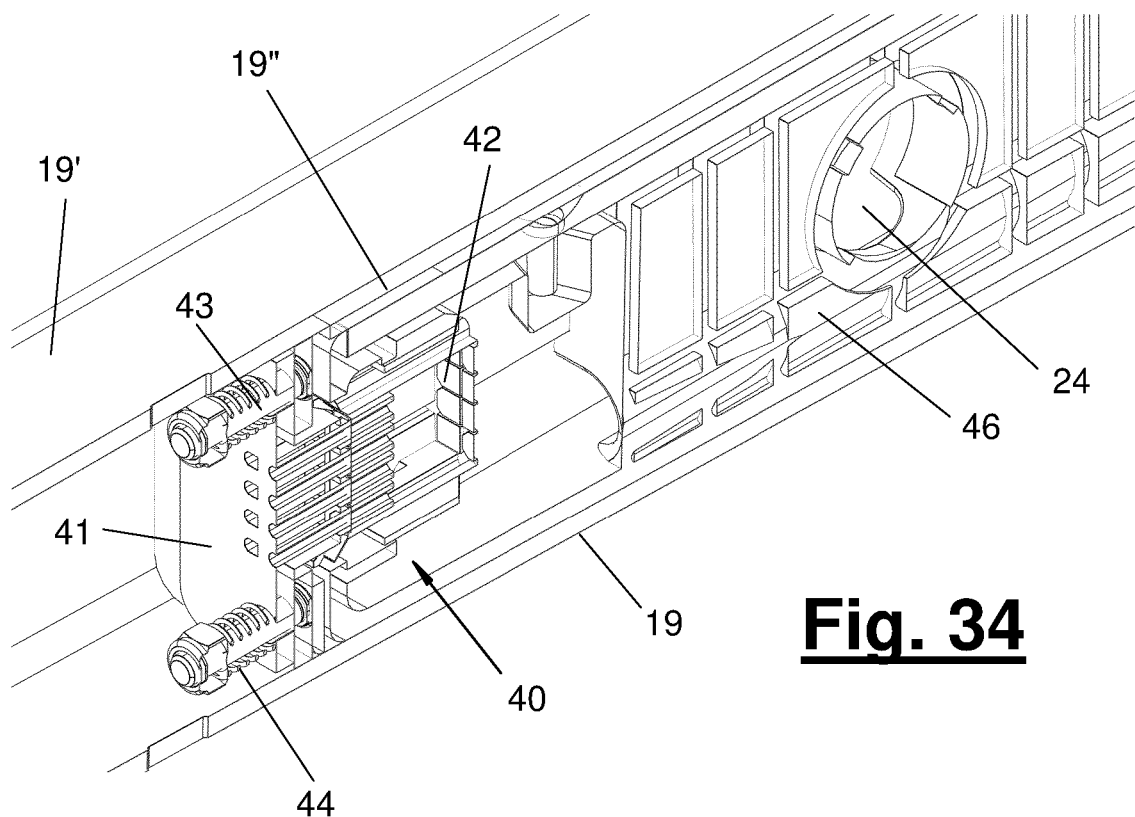
FIG. 34 is a perspective view of plug-in parts of the plug-type connection from FIG. 31.
Figure 35:
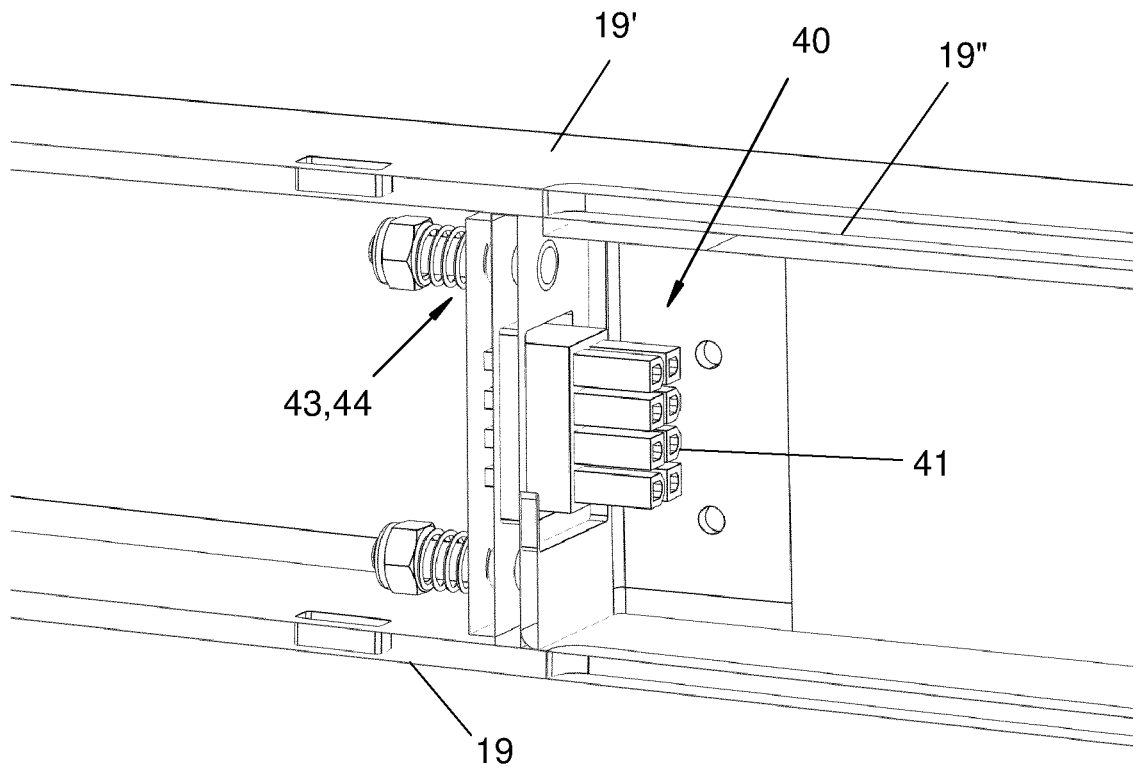
FIG. 35 is a different perspective view of plug-in parts of the plug-type connection from FIG. 31.
Figure 36:
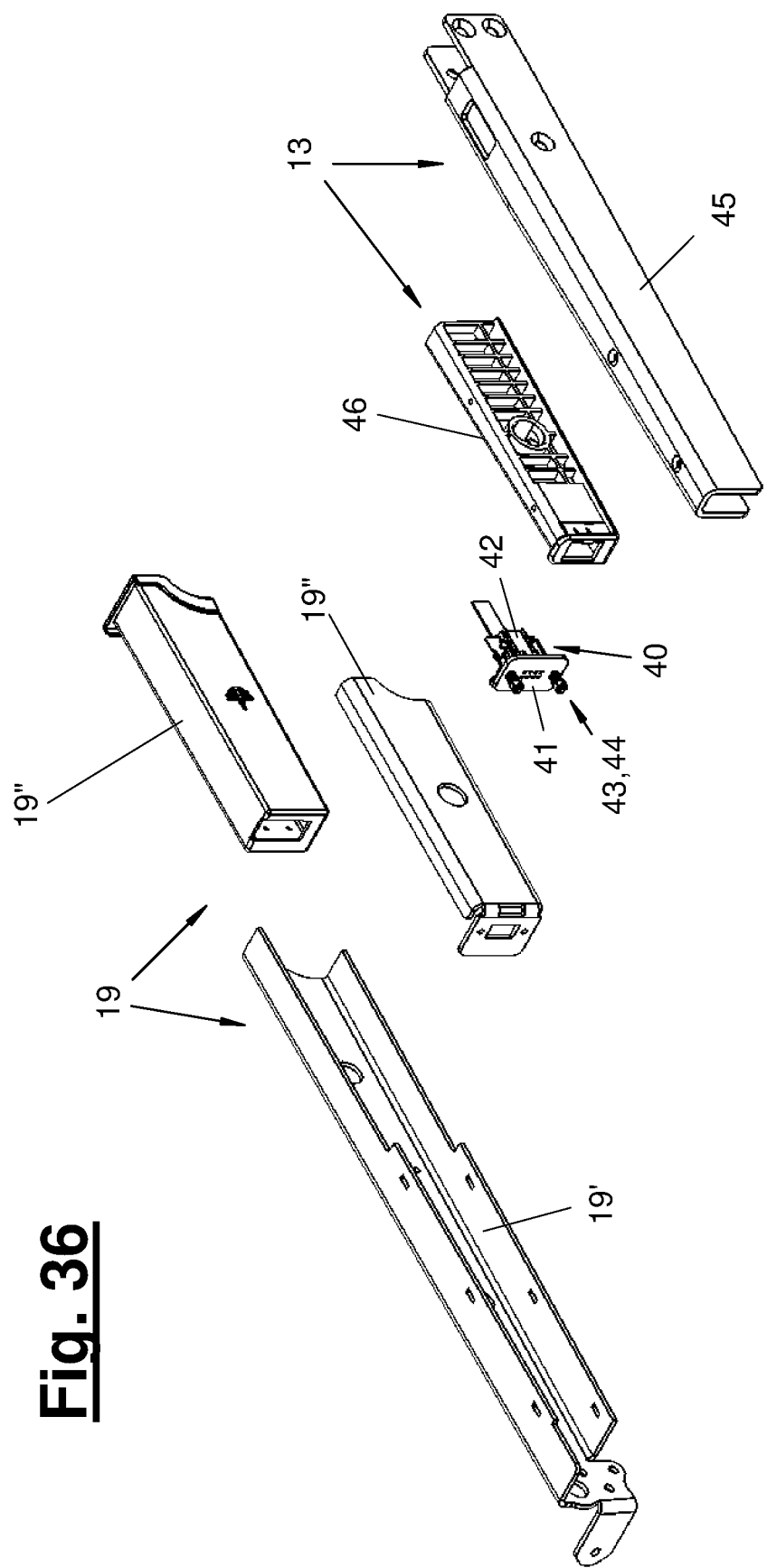
FIG. 36 is an exploded view of the arrangement according to FIG. 31.

According to FIGS. 34 and 35, the plug-in part (41) has a broadened baseplate and passes with its plug contacts projecting at right angles to the baseplate through an opening in the transverse wall of the arm mount (19"). The baseplate remains now outside the arm mount (19") and is connected to a mount (43) formed by two guide pins. A spring (44) each is pulled over the parallel guide pins on the outside between the bottom plate and a broadened pin end. The mount (43) and the guide pins are mounted at the transverse wall of the arm mount (19"). The plug-in part (41) can slide with its baseplate on the guide pins against spring force. As an alternative, the mount (43) may be configured as a guide sleeve or in another manner.

The plug-in part (41) protruding into the hollow interior of the arm mount (19") can be plugged together there, especially in a positive-locking manner, with the other plug-in part (42), especially with a socket. The plug-in part (42) is located at the front-side end of the support arm (12, 13).

The support arm (12, 13) has an arm housing (45) and an insert (46), which is arranged therein and at the front-side end of which the plug-in part (42) is mounted. The insert (46) may consist of an electrically insulating material, e.g., plastic. The plug-in part (42) is fastened at the front end of the insert (46). The fastening may be rigid or have an axial clearance of motion in the direction of the arm. The front end of the insert (46) may have a hollow configuration.

The insert (46) may have the above-described latch mount (24). A fitting passage opening may be present on the inside at the arm housing (45). The support part (19), especially the mount (19"), may likewise have a passage opening for the latch (23) on the latch side.

The arm mount (19") may likewise consist of an electrically insulating material, especially plastic. It may have a multipart configuration and have, e.g., according to FIG. 36, a tube part preferably consisting of plastic as well as a bent fastening part. The support part (19) may further have a, for example, rail-like support device (19"), at the end of which, which end points towards the base part (2), the arm mount (19") is arranged and preferably guided in a positive-locking manner. The fastening part and the support device (19') may consist, e.g., of metal and they may enclose the inserted tube part circumferentially and on the rear side.

Figure 28:
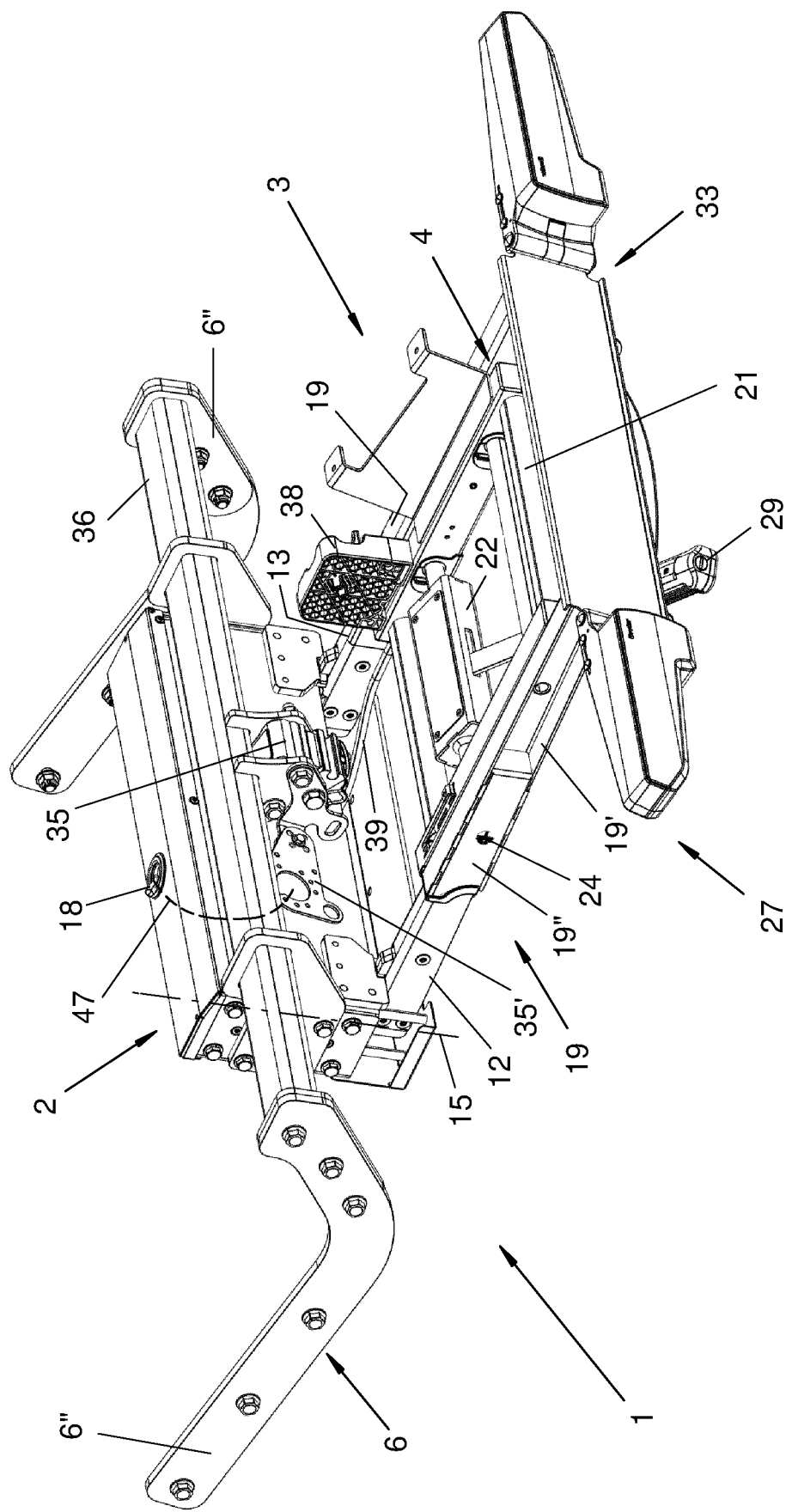
FIG. 28 is a perspective view of a base part of a load carrier with a plug-type connection and with pivoted-out support arms and of individual components of a carrier part of the load carrier.
Figure 29:
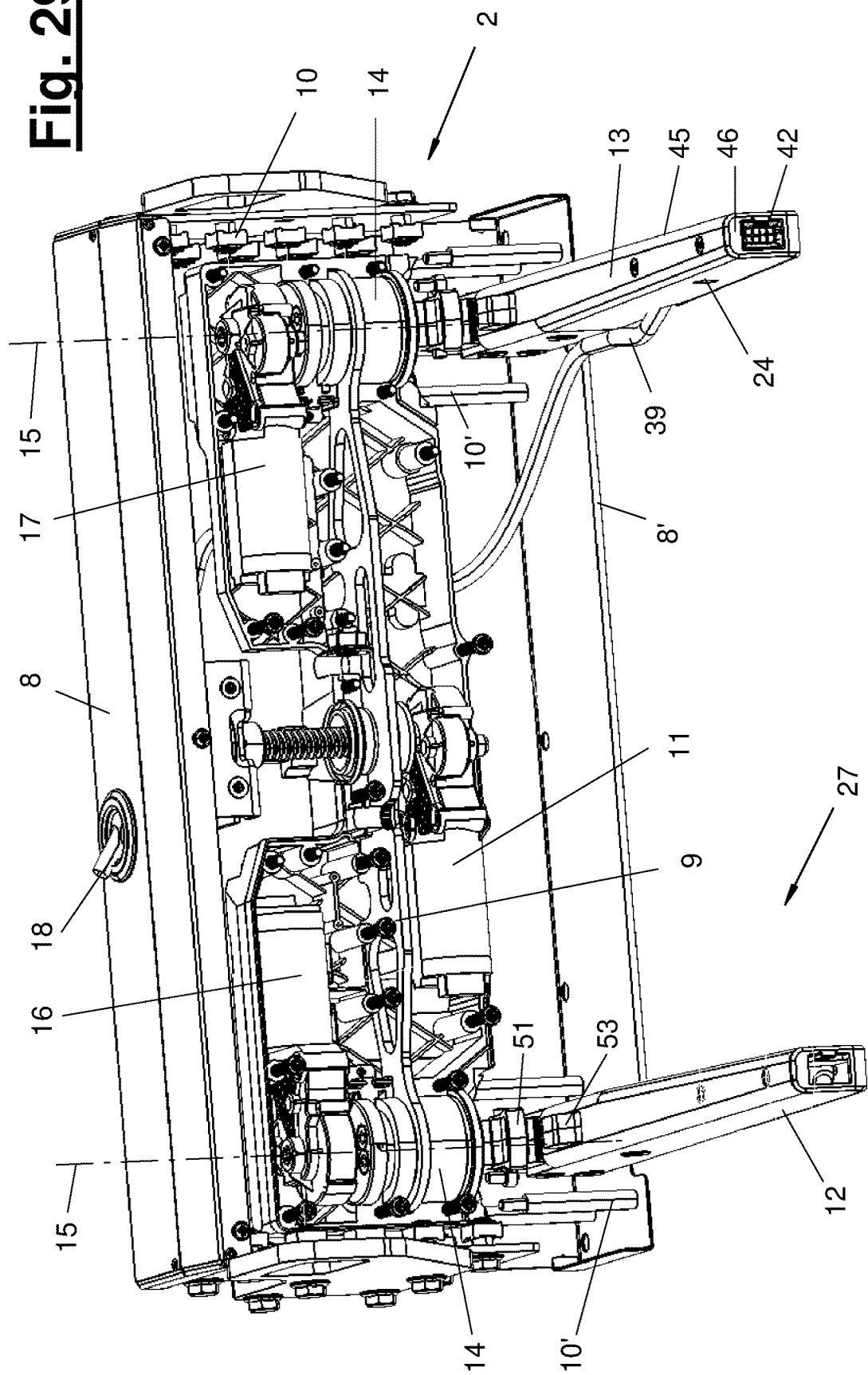
FIG. 29 is a perspective view and a cut-away view of the base part from FIG. 28.
Figure 33:
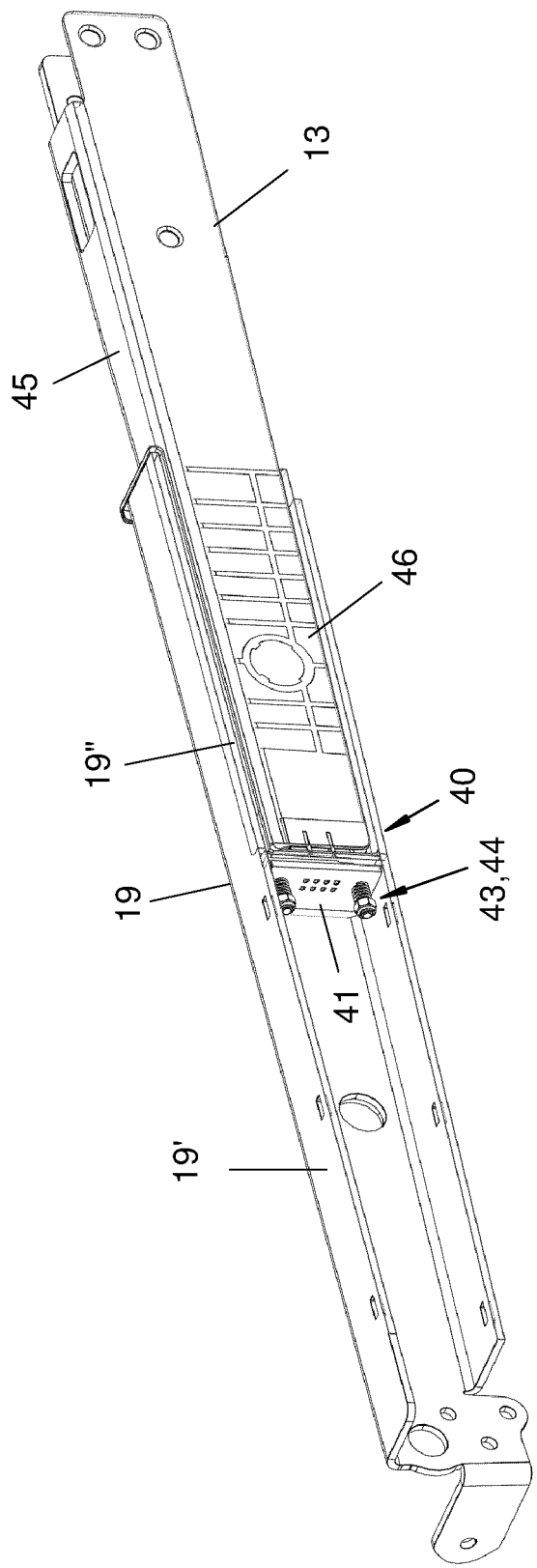
FIG. 33 is a partially cut-away perspective view of the arrangement from FIG. 31.

The plug-in part (42) at the support arm (12, 13) is connected to the energy supply unit (18) by a line (39), e.g., an electric cable. As is shown in FIGS. 28 and 29, the line (39) is led along at the support arm (12, 13). It is motion-tolerant and especially tolerant to pivoting. The line (39) is flexurally elastic in the embodiment shown.

The plug-in part (41) at the support part (19) may likewise be connected to one or more consumers at the carrier part (3, 3'), especially at the light carrier (33), via a line, not shown. This line may be permanently connected to the plug-in part (41).

As is suggested in the drawings, it is also possible to configure the plug-in part (41) as an adapter and to arrange at least one plug, which is detachably connected to the adapter as needed, at the line of the carrier part (3, 3'). It is possible by a corresponding configuration of the plug-in device (41) to supply not only consumers at the light carrier (33) but also possible consumers at a load support device (5, 5'), e.g., lights, locks or the like, which can be actuated electrically or in another manner, with energy and possibly with signals. Various lights, tail lights, brake lights, license plate lights, turn signals, reverse lights or the like, may be arranged at the light adapter (33).

Figure 37:
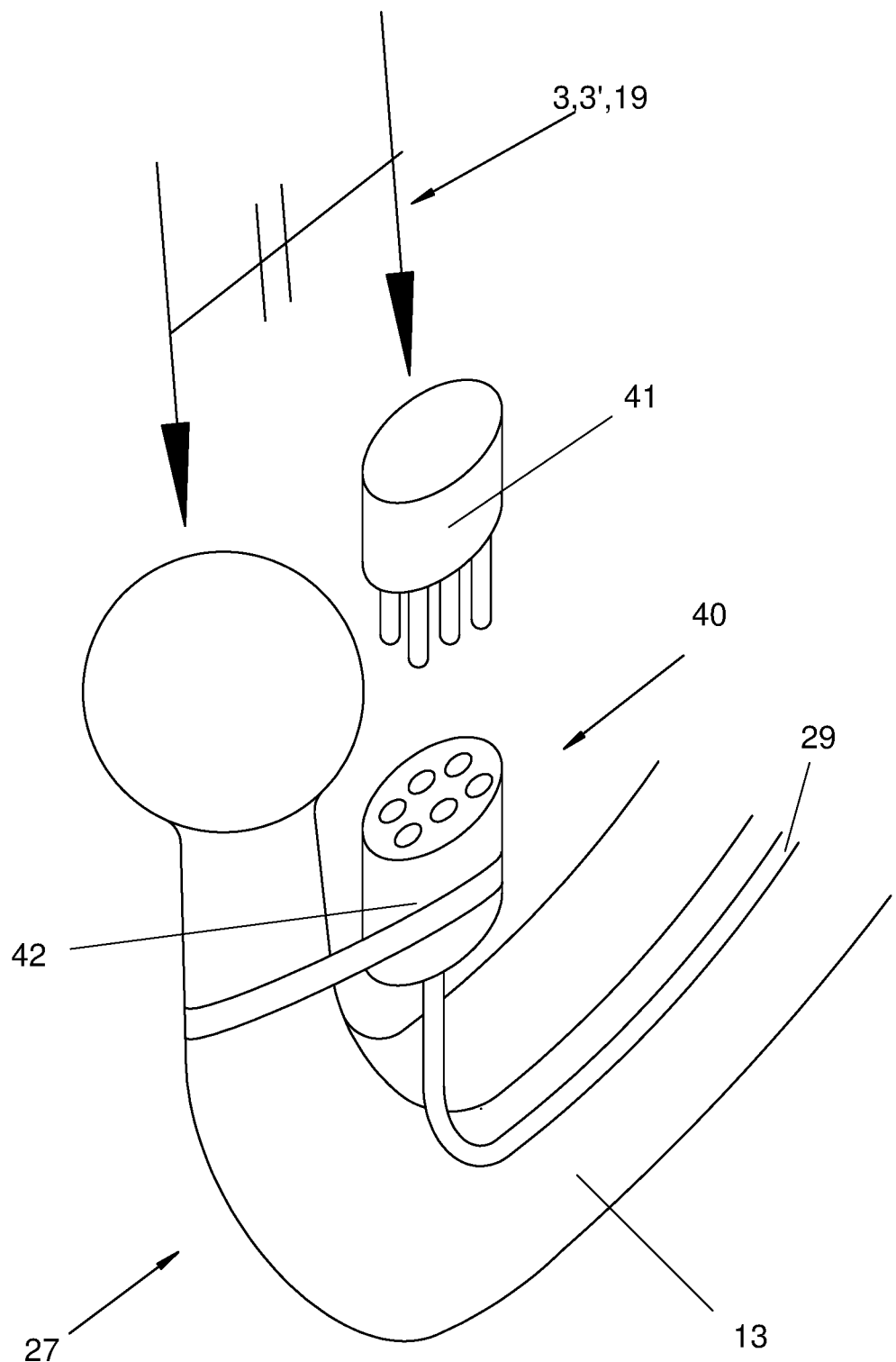
FIG. 37 is a schematic perspective view of a variant of the load carrier with a ball neck and variants of the plug-type connection.
Figure 38:
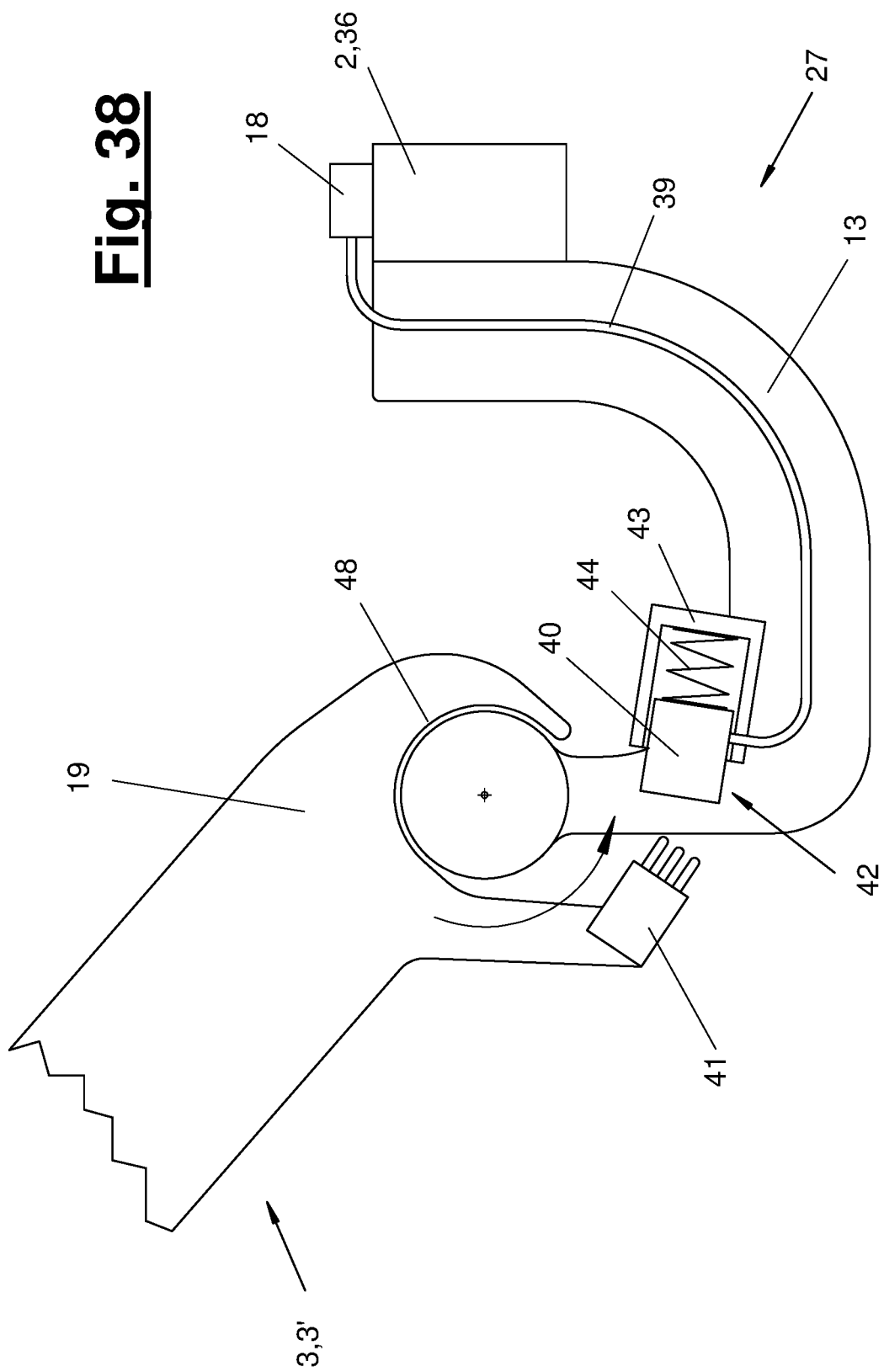
FIG. 38 is a schematic side view of a variant of the load carrier with a ball neck and variants of the plug-type connection.

FIGS. 37 and 38 show other variants of the configuration of a support arm (12, 13) of a carrier part (3, 3') and of a plug-type connection (40). The support arm (13) shown is configured as a bent ball neck. It may be present as a single unit or as a plurality of units and be arranged movably at a said cross beam (36) or base part (2), it may, e.g., be moved, especially pivoted with a corresponding mechanism, possibly driven by a motor, between a concealed out-of-use position and the extended use position (27) shown. The bent ball neck has a ball at the free end. This ball may correspond to a conventional coupling ball of a ball head coupling.

The support part (19) of the carrier part (3, 3') has a round socket (48) for connection to the ball. This socket (48) may have the shape of a ball socket as in a usual trailer coupling.

FIGS. 37 and 38 show each a plug-type connection (40) with two plug-in parts (41, 42), which can preferably be connected in a positive-locking manner. These are arranged laterally at the support arm (13) and at the support part (19). They may have a distance now to the front-side end of the support arm (13) and the support part (19). The support arm (13) is installed along the support part (19) and is tolerant to motion, especially tolerant to pivoting. It is connected on the end side to an energy supply unit (18).

The plug-type connection (40) can be closed automatically in all variants shown at the time of the mechanical connection and fastening of the loose carrier part (3, 3') at the one or more support arms (12, 13). The lateral plug-in parts (41, 42) are aligned in relation to one another and arranged in the variant according to FIG. 37 such that they are plugged together automatically and connected when the support part (19) is plugged vertically onto the support arm (13). The plug-in parts (41, 42) are oriented obliquely in relation to the plug-in direction in the variant according to FIG. 38. They can be connected by a pivoting motion of the plugged-on support part (19), which pivoting motion is marked with an arrow, and this relative motion is led over the contact between the ball and the socket (48).

A mount (43) and a spring (44) may likewise be present in the variants according to FIGS. 37 and 38 for at least one plug-in part (41, 42) to be able to yield in a springy manner.

FIG. 39 shows another variant of the load carrier (1), which is configured for especially heavy loads (28"). Such a load (28") may be, for example, an energy storage device shown in FIG. 39. This energy storage device is configured in the embodiment shown as an electrical range extender battery for an electric vehicle (25), which has an electric motor and a system battery or a rechargeable system battery. These are called consumers (56).

The base part (2) may be configured in the above-described manner and has two or more support arms (12, 13), which can be pivoted out each about a vertical axis into the use position (27). The support arms (12, 13) are arranged at the base part (2) such that they can be lifted and lowered in the above-described manner. As an alternative, the base part (2) may have a different configuration, e.g., without or with another lifting and lowering function.

The carrier part (3") receives the load (28"). It may be configured in the above-described manner and have a carrying bridge (4) with a reinforcement (21) as well as with support parts (19). The carrier part (3") can be pushed onto the pivoted-out support arms (12, 13) on the front side or plugged in from the top. An electric plug-type connection (40) of the above-described type may likewise be present.

The load carrier (1) has a media connection (54) between the range extender battery (28") and at least one consumer (56). The media connection (54) is formed by a suitable electrical line. This line may be connected to a line leading to the consumer in the vehicle (25). The media port may be formed from plug-in parts, one of which is arranged at the media connection (54) and the other at the vehicle (25), especially at the base part (2). The vehicle-side plug-in part may be arranged, for example, at the attachment fitting (6), especially at the crossbeam (36).

The range extender battery (28") may be permanently connected to the carrier part (3"). It may be arranged in an enclosing housing. Another media storage device, especially an energy storage device, may also be configured and arranged in a similar manner. This may be, for example, a gas tank, a fuel tank or the like. The media connection (54) and the media port (55) are correspondingly adapted for this purpose.

The carrier part (3") may be an attached or attachable carrying device (57). The carrying device (57) may be arranged on the underside of the carrier part (3"). It may have an adjustable, especially vertically adjustable configuration. The carrying device (57) may be removed or deactivated for the vehicle operation.

In the embodiment shown, the carrying device (57) is formed, e.g., by support feet, which can be plugged in or pivoted, and which may have rollers for a transport of the carrier part (3") on the underside. A vertical adjustment can be brought about, e.g., by changing the length of the foot by means of a mechanical spindle drive or toothed rack drive or the like with manual actuation by a crank or by means of a drive, e.g., an electric motor or the like.

The carrying device (57) is used to support the carrier part (3") and the load (28") in the removed state, in which the load is removed from the support arms (12, 13). The carrying device (57) relieves an operator and facilitates the handling of the carrier part (3") and of the load (28"). It also makes it possible to dock and undock the carrier part (3") at and from the support arms (12, 13) in a simple manner by a relative travel motion between the vehicle (25) and the carrier part (3") positioned at a suitable level.

As is shown in FIG. 39, the range extender battery (28") can be recharged in the removed position at a charging station, which is, for example, a stationary charging station. An expedited recharging can be carried out in case of an electric vehicle (25) by replacing the range extender battery.

FIG. 40 shows a carrier part (3") for another heavy load (28"), which is formed, e.g., by one or more gas cylinders or by a gas tank. This media storage device can likewise be replaced rapidly.

Various variants of the embodiments shown and described are possible in different manners. In particular, the features of the above-described exemplary embodiments and of the variants mentioned may be combined with one another and optionally also transposed. While specific embodiments of the invention have been shown and described in detail to illustrate the application of the principles of the invention, it will be understood that the invention may be embodied otherwise without departing from such principles.

LIST OF REFERENCE NUMBERS

1 Load carrier, rear carrier
2 Base part
3 Carrier part, bicycle rack
3' Carrier part, box carrier
3" Carrier part, media storage carrier
4 Carrying bridge
5 Load support device, bicycle wheel mount
5' Load support device, box mount
6 Attachment fitting
6' Carrying arm
6" Attachment flange
7 Lifting and pivoting device
8 Housing
8' Bottom part
9 Lifting bridge
10 Guide
10' Stay bar
11 Drive, lifting drive
12 Support arm
13 Support arm
14 Pivot bearing
15 Axis, vertical axis
16 Drive, pivoting drive
17 Drive, pivoting drive
18 Energy supply unit
19 Support part, cuff
19' Support device
19" Arm mount
20 Guide element
21 Reinforcement
22 Locking
23 Latch
24 Latch mount
25 Vehicle, motor vehicle
26 Out-of-use position
27 Use position
28 Load, bicycle
28' Load, container, box
28" Load, media storage device
29 Operating element
30 Fixing element
31 Opening, hole
32 Bracket
33 Light carrier
34 Longitudinal axis, travel direction
35 Trailer coupling
35' Socket holder
36 Crossbeam
37 Auxiliary carrier
38 Fastening device
39 Line
40 Plug-type connection
41 Plug-in part
42 Plug-in part, socket
43 Mount
44 Spring
45 Arm housing
46 Insert
47 Feed line
48 Socket
49 Supporting device
50 Support element, vertical housing edge
51 Support element, vertical, support lug
52 Support element, horizontal, reinforcing plate
53 Support element, horizontal, stop boss
54 Media connection
55 Media port
56 Consumer
57 Carrying device

The invention claimed is:

1. A load carrier for a vehicle, the load carrier comprising:
a plurality of movable and laterally spaced support arms, which are configured for the detachable fastening of a carrier part;
a base part, which is to be arranged secured to a vehicle and at which the plurality of support arms are arranged together, wherein the plurality of support arms are mounted vertically, displaceably, and pivotably about a respective support arm vertical axis and wherein the support arms have parallel straight vertical axes and are arranged together linearly, vertically, and displaceably along the straight vertical axes, wherein the support arms are movable between an out-of-use position and a use position, wherein the support arms are lowered from the out-of-use position and then pivoted out into the use position, wherein the support arms are pivoted in the out-of-use position and can be arranged or are arranged concealed on the underside of the vehicle and are pivoted out in the use position, wherein they may project beyond the rear of the vehicle.

2. A load carrier in accordance with claim 1, wherein the support arms are arranged at the same level in the vertical direction both in the use position and in the out-of-use position and are located in the pivoted out-of-use position one behind the other and next to one another in the axial direction of the vehicle.

3. A load carrier in accordance with claim 1, wherein the base part has a lifting and pivoting device for the support arms.

4. A load carrier in accordance with claim 1, wherein the base part has a closable housing, in which the lifting and pivoting device and the support arms are accommodated and wherein the support arms are arranged concealed in the housing in the out-of-use position and the support arms project out of the opened housing in the use position.

5. A load carrier in accordance with claim 1, wherein the lifting and pivoting device has a vertically adjustable, guided and motor-driven lifting bridge, at which the support arms are arranged together and are mounted pivotably.

6. A load carrier in accordance with claim 5, wherein pivot bearings and the drives of the support arms are arranged at the lifting bridge.

7. A load carrier in accordance with claim 1, wherein a bottom part of the housing is arranged at the lifting bridge and is moved along during the vertical adjustment and wherein the bottom part closes the housing on an underside in the lifting position and leaves open a free space, through which the support arms can be pivoted out of the housing into the use position between the bottom part and the lower housing edge in the lowered position.

8. A load carrier in accordance with claim 1, wherein the base part has a supporting device for supporting the support arms in the pivoted-out use position and wherein the supporting device has interacting support elements at the housing and at the support arms.

9. A load carrier in accordance with claim 1, wherein the load carrier has an attachment fitting for the stationary mounting of the base, at a vehicle and wherein the attachment fitting has a crossbeam for mounting the base part and a trailer coupling.

10. A load carrier in accordance with claim 1, wherein the load carrier has a carrier part, which can be detachably connected to the base part, for receiving a load or charge, wherein the carrier part has a bridge carrying part and a load support device and wherein the carrier part has a detachable locking device for a fixing connection of the carrier parts to the support arms.

11. A load carrier in accordance with claim 10, wherein the carrying part is configured to be connected to the pivoted-out support arms by plugging in, wherein the carrying part transversely connects and supports the pivoted-out support.

12. A load carrier in accordance with claim 10, wherein the locking device acts at the central area of the support arms.

13. A load carrier in accordance with claim 1, wherein the carrier part has an auxiliary carrier for an additional load support device.

14. A load carrier in accordance with claim 1, the carrier part has a media storage device.

15. A load carrier in accordance with claim 1, wherein the load carrier has at the housing an energy supply unit comprising a power supply unit, for the base part as well as of a connected carrier part and wherein the load carrier has a single plug connection for transmitting at least one of and signals between the support arm and the carrier part.

16. A load carrier in accordance with claim 15, wherein the plug-in connection is configured to be closed at the time of fastening the carrier part at the support arm by a guided relative motion between the carrier part and the support arm.

17. A carrier part for a load carrier that comprises a plurality of movable and laterally spaced support arms, which are configured for the detachable fastening of the carrier part and a base part connected to the support arms, the carrier part comprising:

a bridge carrying part;

a load support device wherein the carrying part has two respective support parts, which are detachably connected to support arms connected to the base part; and a detachable locking device for a fixing connection of the carrier part to the support arms, wherein the support arms are movable between an out-of-use position and a use position, wherein the support arms are lowered from the out-of-use position and then pivoted out into the use position, wherein the support arms are pivoted in the out-of-use position and can be arranged or are arranged concealed on the underside of the vehicle and are pivoted out in the use position, wherein they may project beyond the rear of the vehicle.

18. A carrier part in accordance with claim 17, wherein the carrier part has a plug connection for transmitting at least one of energy and signals between the carrier part and a support arm.

\* \* \* \* \*